United States Patent
Horie et al.

(10) Patent No.: US 7,879,471 B2
(45) Date of Patent: Feb. 1, 2011

(54) SUPPORT FOR MAGNETIC RECORDING MEDIUM, AND MAGNETIC RECORDING MEDIUM

(75) Inventors: Masato Horie, Kyoto (JP); Makoto Sato, Otsu (JP); Takuji Higashioji, Kyoto (JP); Yukari Nakamori, Kouka (JP); Hiroaki Watanabe, Utsunomiya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 11/992,388

(22) PCT Filed: Sep. 21, 2006

(86) PCT No.: PCT/JP2006/318706

§ 371 (c)(1),
(2), (4) Date: Aug. 13, 2009

(87) PCT Pub. No.: WO2007/034857

PCT Pub. Date: Mar. 29, 2007

(65) Prior Publication Data

US 2009/0297888 A1   Dec. 3, 2009

(30) Foreign Application Priority Data

Sep. 22, 2005 (JP) .............................. 2005-275124

(51) Int. Cl.
*G11B 5/73* (2006.01)
*G11B 5/78* (2006.01)
*C23C 30/00* (2006.01)

(52) U.S. Cl. .................. 428/846.6; 428/848.8; 427/132

(58) Field of Classification Search ............... 428/425.5, 428/216, 331, 213, 848, 847, 451, 846.4, 428/846.2, 128, 8; 427/128, 129, 130, 131, 427/132; 360/120, 121, 220, 134; 430/111.35
See application file for complete search history.

(56) References Cited

U.S. PATENT DOCUMENTS

| | | | | |
|---|---|---|---|---|
| 4,743,491 A | * | 5/1988 | Asada et al. ................. | 428/213 |
| 2001/0050829 A1 | * | 12/2001 | Kitakami et al. ............ | 360/120 |
| 2002/0018914 A1 | * | 2/2002 | Meguro et al. .............. | 428/847 |
| 2002/0081460 A1 | * | 6/2002 | Feist et al. .................. | 428/847 |
| 2002/0090498 A1 | * | 7/2002 | Peiffer et al. ................ | 428/216 |
| 2002/0110705 A1 | * | 8/2002 | Doushita et al. ............ | 428/848 |

(Continued)

FOREIGN PATENT DOCUMENTS

JP    62-220330 A    9/1987

(Continued)

OTHER PUBLICATIONS

Translation (machine) JP 05-274646 (Oct. 22, 1993).*

(Continued)

*Primary Examiner*—Kevin M. Bernatz
*Assistant Examiner*—Louis Falasco
(74) *Attorney, Agent, or Firm*—Kubovcik & Kubovcik

(57) ABSTRACT

A magnetic recording medium substrate has a polyester film having metallic oxide-containing layers (layers M) formed on both the surfaces, one layer on each surface, the layers M having a thickness of 50 to 200 nm each, characterized in that the magnetic recording medium substrate has a total light transmittance of 0 to 75% and a surface resistivity of $1\times10^2$ to $1\times10^{13}\Omega$ on each surface.

6 Claims, 1 Drawing Sheet

U.S. PATENT DOCUMENTS

| | | | |
|---|---|---|---|
| 2002/0160105 A1* | 10/2002 | Kolb et al. | 427/128 |
| 2003/0170498 A1* | 9/2003 | Inoue | 428/848 |
| 2004/0131868 A1* | 7/2004 | Watanabe et al. | 428/451 |
| 2004/0241454 A1* | 12/2004 | Shaw et al. | 428/425.5 |
| 2005/0112489 A1* | 5/2005 | Fujikawa et al. | 430/111.35 |
| 2005/0238871 A1* | 10/2005 | Robinson et al. | 428/331 |

FOREIGN PATENT DOCUMENTS

| | | |
|---|---|---|
| JP | 05-274646 A | 10/1993 |
| JP | 2005-196944 A | 7/2005 |
| JP | 2005-196944 A | 7/2005 |

OTHER PUBLICATIONS

Translation (machine) JP 2005-196944 (Jul. 21, 2005).*

Abstract JP 05-274646 (Oct. 22, 1993).*

XP002490263, Database WPI week 199348, Thomas Scientific, London, GB; AN, 1993-379957.

* cited by examiner

[Fig. 1]
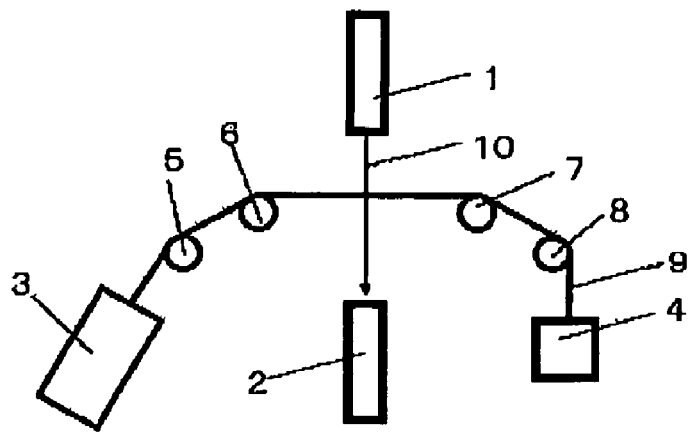
[Fig. 2]
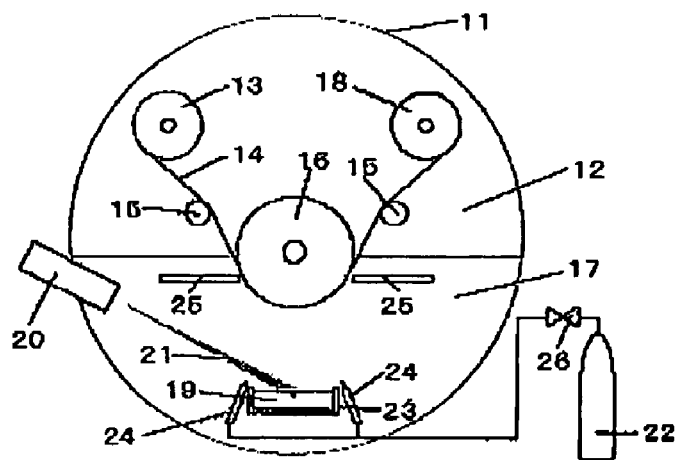
[Fig. 3]
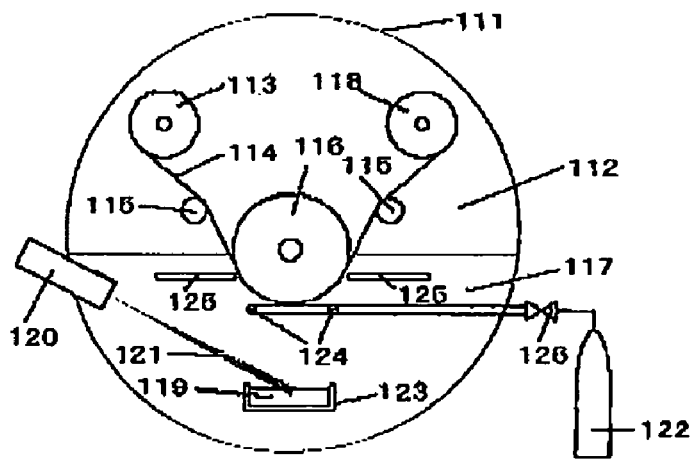
PRIOR ART

SUPPORT FOR MAGNETIC RECORDING MEDIUM, AND MAGNETIC RECORDING MEDIUM

This application is a 371 of international application PCT/JP2006/318706 filed Sep. 21, 2006, which claims priority based on Japanese patent application No. 2005-275124 filed Sep. 22, 2005, which is incorporated herein by reference.

TECHNICAL FIELD

The present invention relates to a substrate used for a magnetic recording medium such as a magnetic tape, and also to a magnetic recording medium with a magnetic layer obtained by using said substrate.

BACKGROUND ART

Biaxially oriented polyester films are used in various applications because of their excellent thermal properties, dimensional stability and mechanical strengths and easy controllability of their surface morphology. It is especially well known that they are useful as substrates of magnetic recording media, etc. In recent years, magnetic recording media such as magnetic tapes are required to be higher in density for adaptation to the machines and materials which become lighter in weight, smaller in size and larger in capacity. For recording at higher densities, it is useful to make the recording wavelength shorter and the recording track smaller. However, if the recording track is made smaller, there arises a problem that the recording track is liable to deviate because of the deformation caused by the heat during tape running or by the changes of temperature and humidity during tape storage. Therefore, the demand for such properties as dimensional stability of tapes in service environment and storage environment grows stronger.

From this point of view, highly stiff aromatic polyamides more excellent in strength and dimensional stability than biaxially oriented polyester films are sometimes used for substrates. However, aromatic polyamides are very expensive and costly and cannot be realistic substrates for general purpose recording media.

On the other hand, magnetic recording medium substrates using polyester films of polyethylene terephthalate, polyethylene naphthalate, etc. enhanced in strength by means of a stretching technology are developed. However, they cannot yet satisfy the severe requirement for dimensional stability under changing temperature and humidity conditions.

Further, for improving the dimensional stability under changing temperature and humidity conditions, a method of forming a reinforcing layer of a metal or the like on one surface or each of both the surfaces of a polyester film (Patent Document 1) is disclosed. However, in the case where the reinforcing layer is formed of a metal, the layer is highly conductive and has a nature of reflecting light because of metallic bonding. For this reason, though transmission light is used to control the film thickness of the magnetic layer formed by coating, there arises a problem that the reinforcing film formed of a metal does not allow the transmission of light. So, film thickness control becomes difficult, and since the magnetic layer becomes irregular in thickness, a magnetic tape with a large error rate is liable to be formed. Further, since the magnetic tape has high conductivity, static electricity and leak current cause a current to flow in the magnetic tape, and the current may short-circuit or trouble the magnetic head. Furthermore, there is another problem that since a metal is lower in strength than an oxide, the effect of inhibiting the expansion and contraction of the polyester film is small. On the other hand, in the case where the reinforcing layer is formed of an oxide or any other compound, it has such natures as being hard but fragile and not ductile because of ionic bonding. So, tension may cause cracking, and curving may cause cracking. Moreover, since an oxide is hygroscopic, the reinforcing layer is small in the effect of improving dimensional stability under a changing humidity condition, and the hygroscopic expansion of the reinforcing layer per se may lower the dimensional stability.

The inventors made an intensive study and as a result, found that if the oxidation degree of the reinforcing layer is controlled instead of perfectly oxidizing the metal, the dimensional stability can improve dramatically, and many of the above-mentioned problems can be solved.

Meanwhile, a technique of vapor-depositing a metal oxide layer controlled in oxidation degree is disclosed as a gas barrier film (Patent Document 2). However, the film described in this document is a packaging film intended to be used as a gas barrier, and since it is required to be transparent, the vapor deposition film has a small thickness of 40 nm or less, and the metal oxide layer is small in the effect of inhibiting the expansion and contraction of the polyester film. Further, to vapor-deposit a 50 nm or thicker metal oxide layer controlled in oxidation degree, it is necessary to increase the evaporated amount of aluminum, and accordingly, it is necessary to increase also the introduced amount of oxygen. However, according to the method described in this document, since a vacuum evaporator as shown in FIG. 3 is used, it is difficult to increase the thickness of the metal oxide layer. That is, in the vacuum evaporator 111, a polyester film runs from an unwinding roll 113 along a cooling drum 116 to a winding roll portion 118 in a vacuum chamber 112. At this time, a metallic material 119 in a crucible 123 is heated and evaporated by an electron beam 121 emitted from an electron gun 120, and at the same time, oxygen gas is introduced from oxygen supply nozzles 124 to perform an oxidation reaction with the evaporated metal, the reaction product being vapor-deposited on the polyester film on the cooling drum 116. However, since the oxygen supply nozzles 124 are installed near the cooling drum 116, the increase in the introduced amount of oxygen causes the oxygen gas flow to scatter the metal vapor, making it difficult to control the oxidation degree. Further, partly because the space where the metal and oxygen react with each other is small, it is difficult to form a 50 nm or thicker metal oxide vapor deposition layer, and the formed vapor deposition layer is liable to be unstable. The unstable vapor deposition layer produces numerous structural defects, to lower the dimensional stability. Moreover, since the gas barrier film is used as a packaging material, the base film is as thick as 10 μm or more and is not smooth on the surface, to allow easy vapor deposition. On the contrary, the polyester film used as a magnetic recording medium substrate is generally thin in thickness and smooth, and if vapor deposition is performed without any particular contrivance by a method as described above, heat deformation or the like can cause the film to be broken frequently during vapor deposition.

[Patent document 1] JP7-272247A
[Patent document 2] JP62-220330A

DISCLOSURE OF THE INVENTION

Problem to be Solved by the Invention

The object of this invention is to solve the above-mentioned problem by providing a magnetic recording medium substrate excellent in dimensional stability and unlikely to be cracked. In more detail, the object of this invention is to provide a substrate capable of being used to produce a high density magnetic recording medium little dimensionally changing under environmental changes, little unlikely to be cracked, small in error rate and excellent in running durability.

Means for Solving the Problem

This invention for solving the aforesaid problem has the following constitutions (1) through (8).
(1) A magnetic recording medium substrate comprising a polyester film having metallic oxide-containing layers (layers M) formed on both the surfaces, one layer on each surface, the layers M having a thickness of 50 to 200 nm each, characterized in that the magnetic recording medium substrate has a total light transmittance of 0 to 75% and a surface resistivity of $1\times10^2$ to $1\times10^{13}\Omega$ on each surface.
(2) A magnetic recording medium substrate, according to said (1), wherein the center-line mean roughness Ra of at least one surface is 0.5 to 10 nm.
(3) A magnetic recording medium substrate, according to said (1) or (2), wherein the Young's modulus in the machine direction is 5 to 13 GPa.
(4) A magnetic recording medium substrate, according to any one of said (1) through (3), wherein the thickness of said polyester film is 2 to 6 μm.
(5) A magnetic recording medium substrate, according to any one of said (1) through (4), wherein the metal element concentration of the layers M is 10 to 70 at %.
(6) A magnetic recording medium substrate, according to any one of said (1) through (5), wherein the abundance ratio of the metal atoms held together by metallic bonding in the layers M is 1 to 20 at %.
(7) A magnetic recording medium substrate, according to any one of said (1) through (6), wherein the metallic oxide of the layers M is aluminum oxide, and the abundance ratio of the aluminum atoms bound to hydroxyl groups is 0 to 60 at %.
(8) A magnetic recording medium comprising the magnetic recording medium substrate as set forth in any one of said (1) through (7) and a magnetic layer formed on at least on one of the surfaces of said magnetic recording medium.

Effects of the Invention

The magnetic recording medium substrate of this invention is a substrate excellent in dimensional stability and little unlikely to be cracked. Especially the substrate can be used to produce a magnetic recording medium substrate little dimensionally changing under environmental changes, little unlikely to be cracked and small in error rate.

BRIEF DESCRIPTION OF THE DRAWINGS

[FIG. 1] is a typical view showing a sheet width measuring instrument used for measuring the width dimension.
[FIG. 2] is a typical view showing a vacuum evaporator used for producing the substrate of this invention.
[FIG. 3] is a typical view showing a vacuum evaporator used for producing a conventional substrate.

MEANINGS OF SYMBOLS

1: laser oscillator
2: light receiving portion
3: load detector
4: load
5: free roll
6: free roll
7: free roll
8: free roll
9: magnetic tape
10: laser beam
11: vacuum evaporator
12: vacuum chamber
13: unwinding roll portion
14: polyester film
15: guide roll
16: cooling drum
17: vapor deposition chamber
18: winding roll portion
19: metallic material
20: electron gun
21: electron beam
22: oxygen gas cylinder
23: crucible
24: oxygen supply nozzle
25: mask
26: gas flow controller
111: vacuum evaporator
112: vacuum chamber
113: unwinding roll portion
114: polyester film
115: guide roll
116: cooling drum
117: vacuum deposition chamber
118: winding roll portion
119: metallic material
120: electron gun
121: electron beam
122: oxygen gas cylinder
123: crucible
124: oxygen supply nozzle
125: mask
126: gas flow controller

THE BEST MODES FOR CARRYING OUT THE INVENTION

The magnetic recording medium substrate of this invention has a polyester film having metallic oxide-containing layers (layers M) formed on both the surfaces, one layer on each surface. The metallic oxide is obtained by oxidizing the metal used as an ingredient such as Cu, Zn, Al, Si, Fe, Ag, Ti, Mg, Sn, Zr, In, Cr, Mn, V, Ni, Mo, Ce, Ga, Hf, Nb, Ta, Y or W, and refers to a metallic oxide with an oxygen atom content of 10 at % or more in the average chemical composition obtained by analysis. Meanwhile, at % is an abbreviation of atomic % that expresses the number of the atoms concerned per 100 atoms.

The metallic oxide on one surface may be different in the contained metal ingredient from that of the other surface, if the total light transmittance and the surface resistivity of the substrate can be kept in the ranges described later. Further, the metal ingredient can also be a mixture consisting of plural metals. However, it is preferred that the metal ingredient contained in one surface is the same as the metal ingredient contained in the other surface. Above all, in view of oxidation degree controllability, dimensional stability, productivity and environment, it is preferred that the metallic oxide contains at least one of aluminum, copper, zinc, silver and silicon elements. It is more preferred that aluminum element is contained as a main ingredient.

It is preferred that the metal element concentration of the layers M is 10 to 70 at %. If the metal element concentration is smaller than 10 at %, the number of oxygen atoms for the number of metal atoms is too large, and an imperfect structure (unbound metal atoms and oxygen atoms exist) is likely to be formed. So, the reinforcing effect is so small as to lower the dimensional stability. If it is larger than 70 at %, the layers have the properties close to those of a metal. So, such problems as short-circuit due to conductivity, low strength and low dimensional stability arise. A more preferred range is 20 to 60 at %, and a further more preferred range is 30 to 50 at %. The metal element concentration can be controlled by adjusting the evaporated amount of the metal and the introduced amount of oxygen gas. The metal element concentration can be decreased by decreasing the evaporated amount of the metal and increasing the introduced amount of oxygen gas, and the metal element concentration can be increased by doing contrary.

Further, it is preferred that the abundance ratio of the metal atoms held together by metallic bonding is 1 to 20 at %. In the case where the abundance ratio of the metal atoms held together by metallic bonding is smaller than 1 at %, since the amount of tough metallic bonding is small even if the metal element concentration is in said range, cracking is likely to occur. In the case where it is larger than 20 at %, the properties like those of a metal are likely to cause the problem of short-circuit owing to conductivity, even if the metal element concentration is in said range. Since the metal atoms held together by metallic bonding are unlikely to absorb moisture, structural defects are unlikely to be produced to prevent the dimensional stability from declining. A more preferred range is 2 to 15 at %, and a further more preferred range is 3 to 10 at %. The abundance ratio of the metal atoms held together by metallic bonding can be controlled by adjusting the evaporated amount of the metal and the introduced amount of oxygen gas. The abundance ratio of the metal atoms held together by metallic bonding relates to a composition concerned with a structure more microscopic than that of the metal element concentration, and the control of oxidation reaction is important. Since the abundance ratio of the metal atoms held together by metallic bonding is affected by the reaction efficiency between the metal and oxygen gas, the method of introducing oxygen gas is important. It is preferred that oxygen gas is supplied from a lateral side of the evaporation source in the same direction as that in which the metal vapor flows. According to this method, the reaction between the metal vapor and oxygen gas is promoted, and after completion of oxidation reaction, the reaction product reaches the polyester film. So, it does not happen that excessive oxygen gas is incorporated to decrease the abundance ratio of the metal atoms held together by metallic bonding or that the metal atoms incapable of reacting with oxygen gas are bound to each other to increase the abundance ratio of the metal atoms held together by metallic bonding. Further, since the reaction is promoted if the metal vapor and oxygen gas are made to have higher energy, it is preferred to make the metal vapor have higher energy by an electron beam vapor deposition method and to make the oxygen gas have higher energy by plasma treatment, etc.

It is preferred that the metal ingredient of the layers M is aluminum element as described above, and that the layers M are formed of aluminum oxide. Further, as for the binding state of aluminum in aluminum oxide, it is preferred that the abundance ratio of aluminum atoms bound to hydroxyl groups is 0 to 60 at %. In general, aluminum oxide absorbs water vapor, to form a hydrate ($Al(OH)_3$). In the present application, the hydrate is also considered to be aluminum oxide. Being bound to hydroxyl groups means that aluminum atoms absorb moisture to form the hydrate. If the binding state of aluminum is analyzed by X-ray photoelectron spectroscopy (XPS), the abundance ratio of the aluminum atoms bound to hydroxyl groups can be measured. If the hydrate is formed, partial volume change occurs, to internally strain the layers M, and structural defects occur. Since the formed hydrate is a cause for lowering the dimensional stability, it is preferred that the abundance ratio of the aluminum atoms bound to hydroxyl groups is 60 at % or less. More preferred is 50 at % or less, and further more preferred is 40 at % or less. To keep the abundance ratio of the aluminum atoms bound to hydroxyl groups small, it is preferred not to form the hydrate, namely, not to allow moisture absorption. If aluminum atoms and oxygen atoms are firmly bound to each other to decrease unbound aluminum atoms and oxygen atoms, for forming the layers M free from an imperfect structure, moisture absorption can be prevented. It is preferred that there is no imperfect structure, but if an imperfect structure is produced when the layers. M are formed, it is preferred to forcibly cause moisture absorption at a time, for eliminating unbound aluminum and oxygen atoms from the layers M as a whole. That is, after the layers M are formed, it is preferred to perform forcible humidification treatment for eliminating unbound atoms. If humidification treatment is not performed to leave unbound atoms, partial moisture absorption occurs to cause volume change, etc., and structural defects are likely to be produced in the layers M. Structural defects cause further moisture absorption, and there may be a case where the abundance ratio of the aluminum atoms bound to hydroxyl groups becomes higher than that achieved when no humidification treatment is performed.

Further, if the polyester film absorbs moisture when the layers M are formed, it can happen that the water is discharged from the polyester film owing to the heat load, etc. acting when the layers M are formed, and is incorporated into the layers M, to form the hydrate. It is preferred to decrease the water content of the polyester film before the layers M are formed.

It is necessary that the layers M have a thickness of 50 to 200 nm each. If the thickness of the layers M is smaller than 50 nm, the reinforcing effect is small and the dimensional stability cannot be improved. It is preferred that the lower limit in the thickness of the layers M is 60 nm. More preferred is 70 nm. On the other hand, if the thickness of the layers M is larger than 200 nm, cracking is likely to occur, and the dimensional stability is likely to decline. Further, after repeated running, the layers M are likely to peel and to come off in a tendency to lower the dimensional stability as a result. Furthermore, though it is necessary to increase the introduced amount of oxygen for keeping the total light transmittance and the surface resistivity within the respective ranges of this invention, if it is attempted to form layers M with a thickness of 200 nm or more using a vacuum film-forming device, the vacuum degrees declines, and the metal is unlikely to be evaporated, causing the metal vapor to be unstable. As a result, the layers M have an imperfect structure, and the produced magnetic recording medium becomes poor in dimensional stability and running durability. Further, if the introduced amount of oxygen is too large in a sputtering method, the surface of the target is oxidized to destabilize the sputtering of metal atoms. As a result, as in the case of vapor deposition method, an imperfect structure is formed, and the produced magnetic recording medium becomes poor in dimensional stability and running durability. It is preferred that the upper limit of the thickness of layers M is 180 nm. More preferred is 150 nm. A preferred range is 60 to 180 nm, and a more preferred range is 70 to 150 nm.

It is necessary that the magnetic recording medium substrate of this invention has a total light transmittance of 0 to 75%. If the total light transmittance is higher than 75%, oxidation progresses so much as to make the layers M hard and fragile, and cracking is liable to be caused by tension or curving. Further, the hygroscopic expansion of the oxide is likely to occur in a tendency to lower the dimensional stability. It is more preferred that the lower limit of total light transmission is 1%. Further more preferred is 5%. On the other hand, it is preferred that the upper limit is 70%, and further more preferred is 65%. Meanwhile, a substrate with a total light transmittance of 0% is also included in this invention. The reason is that in the case where the substrate has a layer containing a metallic oxide obtained by oxidizing the above-mentioned metal ingredient only slightly, there can be a case where the total light transmittance is 0%, namely, lower than the detection limit, though the surface resistivity conforms to the range described later. A more preferred range is 1 to 70%, and a further more preferred range is 5 to 65%.

The magnetic recording medium substrate of this invention has a surface resistivity of $1\times10^2$ to $1\times10^{13}\Omega$, and a preferred range is $1.0\times10^2$ to 9.9 to $10^{12}\Omega$. A surface resistivity refers to a property value expressed also as a surface specific resistance ($\Omega/\square$), and is different from a pure surface resistance (the resistance value changes depending on the area) or a line resistance (resistance of conductor, etc.). In the case where the surface resistivity is lower than $1.0\times10^2\Omega$, since the conductivity is too high, the current flows in the magnetic tape due to static electricity or leak current, and may cause the magnetic head to be short-circuited or troubled. It is preferred that the lower limit of the surface resistivity is $1.0\times10^4\Omega$, and more preferred is $1.0\times10^5\Omega$. On the other hand, if the surface resistivity is higher than $1\times10^{13}\Omega$, especially higher than $9.9\times10^{12}\Omega$, oxidation progresses too much as in the case of high transmittance in a tendency to cause cracking or lowering the dimensional stability. It is preferred that the upper limit of the surface resistivity is $9.9\times10^{11}\Omega$, and more preferred is $9.9\times10^{10}\Omega$. A preferred range is $1.0\times10^4$ to $9.9\times10^{11}\Omega$, and a more preferred range is $1.0\times10^5$ to $9.9\times10^{10}\Omega$. Meanwhile, the surface (A) on the side to be provided with the magnetic layer and the surface (B) on the side not provided with the magnetic layer, namely, the surface on the side of the back coating layer can be identical in the value of surface resistivity, but it is preferred that the surface resistivity of the surface (B) on the side of the back coating layer is lower.

Further, in the magnetic recording medium substrate of this invention, it is preferred that the center-line mean roughness Ra of the surface (A) on the side provided with the magnetic layer is 0.5 nm to 10 nm. If the Ra of the surface (A) on the side provided with the magnetic layer is smaller than 0.5 nm, the friction coefficient with carrier rolls, etc. increases, for example, when the film is produced or processed, and process troubles can happen. In the case where the magnetic recording medium substrate is used as a magnetic tape, the friction with the magnetic head becomes large, and the properties of the magnetic tape are likely to decline. Further, in the case where Ra is larger than 10 nm, if the recording medium substrate is used as a magnetic tape for high density recording, the electromagnetic conversion properties may decline. It is more preferred that the lower limit of Ra of the surface (A) on the side provided with the magnetic layer is 2 nm, and further more preferred is 3 nm. It is more preferred that the upper limit is 9 nm, and further more preferred is 8 nm. A more preferred range is 2 to 9 nm, and a further more preferred range is 3 to 8 nm.

On the other hand, it is preferred that the center-line mean roughness Ra of the surface (B) on the side of the back coating layer is 3 to 30 nm. If the Ra of the surface (B) on the side of the back coating layer is smaller than 3 nm, the friction coefficient with the carrier rolls, etc. becomes large, for example, when the film is produced or processed, and process troubles can happen. If the magnetic recording medium substrate is used as a magnetic tape, the friction with the guide rolls becomes large, and the tape running properties may decline. Further, in the case where Ra is larger than 30 nm, when the magnetic recording medium substrate is stored as a film roll or pancake, the surface projections are transferred to the other surface kept in contact with them in a tendency to lower the electromagnetic conversion properties. It is more preferred that the lower limit of the Ra of the surface (B) on the side of the back coating layer is 5 nm, and further more preferred is 7 nm. It is more preferred that the upper limit is 20 nm, and further more preferred is 15 nm. A more preferred range is 5 to 20 nm, and a further more preferred range is 7 to 15 nm.

It is preferred that the magnetic recording medium substrate of this invention has a humidity expansion coefficient of $-3$ to 10 ppm/% RH in the transverse direction. It is preferred that the humidity expansion coefficient is in the aforesaid range in view of the dimensional stability under a high humidity condition when the substrate is processed into a magnetic recording medium or when the magnetic recording medium is used for recording and reproduction. It is more preferred that the upper limit of the humidity expansion coefficient in the transverse direction is 8 ppm/% RH, and further more preferred is 7 ppm/% RH. It is more preferred that the lower limit of the humidity expansion coefficient in the transverse direction is $-1$ ppm/% RH, and more preferred is 0 ppm/% RH. A more preferred range is $-1$ to 8 ppm/% RH, and a further more preferred range is 0 to 7 ppm/% RH.

It is preferred that the magnetic recording medium substrate of this invention has a Young's modulus of 5 to 13 GPa in the machine direction. If the Young's modulus in the machine direction is smaller than 5 GPa, the tension in the machine direction within the tape drive causes the substrate to elongate in the machine direction, and the elongation deformation causes the substrate to shrink in the transverse direction. Thus, the problem of recording track deviation is liable to occur. It is more preferred that the lower limit of Young's modulus in the machine direction is 6 GPa, and further more preferred is 7 GPa. On the other hand, if the Young's modulus in the machine direction is larger than 13 GPa, it is difficult to control the Young's modulus in the transverse direction within a preferred range, and the Young's modulus in the transverse direction becomes insufficient to cause edge damage. It is preferred that the upper limit of the Young's modulus in the machine direction is 12 GPa, and further more preferred is 11 GPa. A more preferred range is 6 to 12 GPa, and a further more preferred range is 7 to 11 GPa.

It is preferred that the magnetic recording medium substrate of this invention has the Young's modulus in the transverse direction kept in a range from 5 to 13 GPa. If the Young's modulus in the transverse direction is smaller than 5 GPa, edge damage may be caused. It is more preferred that the lower limit of the Young's modulus in the transverse direction is 6 GPa, and further more preferred is 7 GPa. On the other hand, if the Young's modulus in the transverse direction is larger than 13 GPa, it is difficult to control the Young's modulus in the machine direction in a preferred range, and the tension in the machine direction is likely to cause deformation and may deteriorate the slit properties. It is more preferred that the upper limit of the Young's modulus in the transverse direction is 12 GPa, and furthermore preferred is 11 GPa. A more preferred range is 6 to 12 GPa, and a further more preferred range is 7 to 11 GPa.

Meanwhile, in this invention, the machine direction of the substrate is the direction generally called the MD direction, and refers to the same direction as the machine direction referred to when the polyester film is produced. The transverse direction of the substrate is the direction generally called the TD direction and refers to the same direction as the transverse direction referred to when the polyester film is produced.

In this invention, the polyester film is formed of a polymer with an acid component such as an aromatic dicarboxylic acid, alicyclic dicarboxylic acid or aliphatic dicarboxylic acid and a diol component as building blocks (polymerization units).

Examples of the aromatic dicarboxylic acid component include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyletherdicarboxylic acid, 4,4'-diphenylsulfonedicarboxylic acid, etc. Among them, terephthalic acid, phthalic acid and 2,6-naphthalenedicarboxylic acid can be used. Examples of the alicyclic dicarboxylic acid component include cyclohexanedicarboxylic acid, etc. Examples of the aliphatic dicarboxylic acid component include adipic acid, suberic acid, sebacic acid, dodecanedioic acid, etc. One of these acid components can be used alone or two or more of them can also be used together.

Examples of the diol component include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2'-bis(4'-β-hydroxyethoxyphenyl)propane, etc. Among them, ethylene glycol, 1,4-butanediol, 1,4-cyclohexanedimethanol, diethylene glycol, etc. can be preferably used. Ethylene glycol, etc. can be especially preferably used. Any one of these diol components can be used alone or two or more of them can also be used together.

The polyester can also be copolymerized with a monofunctional compound such as lauryl alcohol or phenyl isocyanate or can also be copolymerized with a trifunctional compound such as trimellitic acid, pyromellitic acid, glycerol, pentaerythritol or 2,4-dioxybenzoic acid, etc. to such an extent that the polymer remains substantially linear without excessive branching or crosslinking. Further, in addition to the acid component and the diol component, an aromatic hydroxycarboxylic acid such as p-hydroxybenzoic acid, m-hydroxybenzoic acid or 2,6-hydroxynaphthoic acid, or p-aminophenol, p-aminobenzoic acid, etc. can be further copolymerized, if the amount is so small as not to impair the effects of this invention.

As the polyester, polyethylene terephthalate or polyethylene naphthalate is preferred. Further, any of their copolymers and modification products can also be used, or a polymer alloy with another thermoplastic resin can also be used. The polymer alloy in this specification refers to a polymeric multicomponent system and can be a block copolymer obtained by copolymerization or a polymer blend obtained by mixing, etc. Especially a polymer alloy consisting of any of said polyester resins and a polyimide-based resin can be preferably used, since a polymer suitable for service conditions can be designed because the heat resistance (glass transition temperature) can be controlled by a mixing ratio. The mixing ratio of a polymer can be examined using an NMR method (nucleic magnetic resonance method) or microscope FT-IR spectroscopy (micro-Fourier Transform Infrared Spectroscopy).

Preferred examples of the polyimide-based resin include resins containing building blocks as represented by the following general formulae.

[Chemical formula 1]

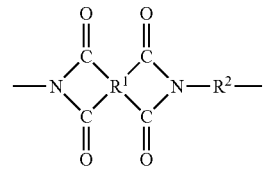

where $R^1$ denotes one or more types of groups selected from aliphatic hydrocarbon groups, alicyclic hydrocarbon groups and aromatic hydrocarbon groups as represented by

[Chemical formulae 2]

(a)

(b)

(c)

(d)

(e)

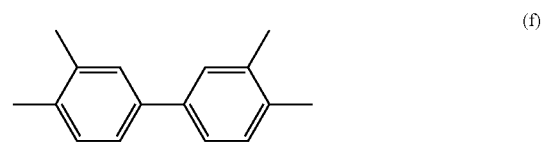

(f)

(g)

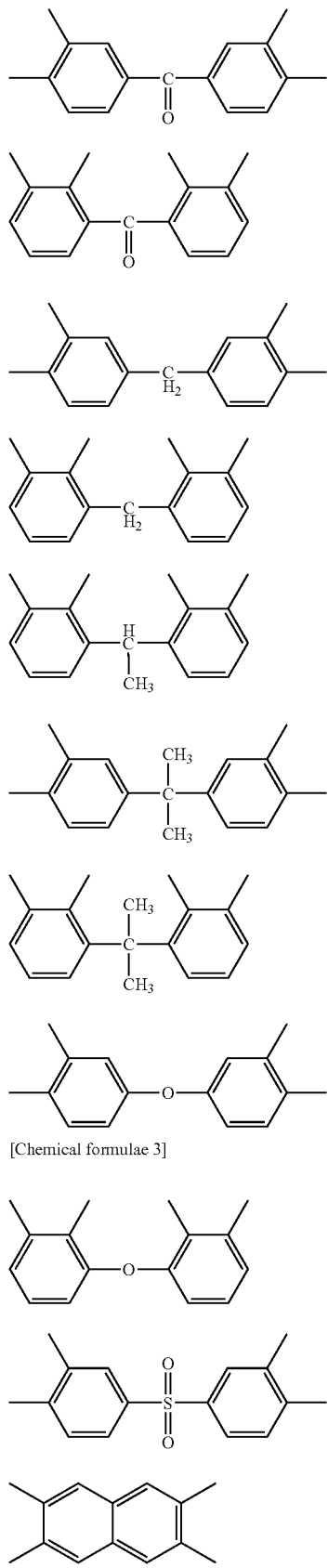
[Chemical formulae 3]
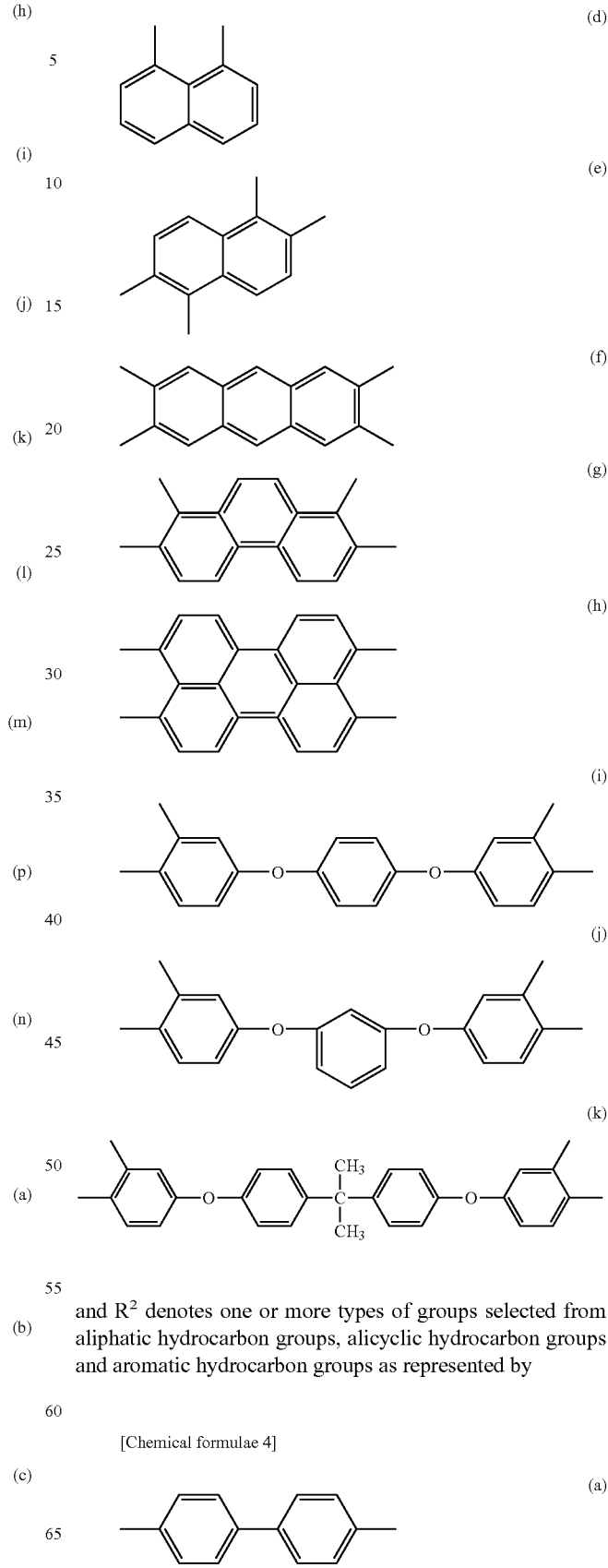
and $R^2$ denotes one or more types of groups selected from aliphatic hydrocarbon groups, alicyclic hydrocarbon groups and aromatic hydrocarbon groups as represented by
[Chemical formulae 4]

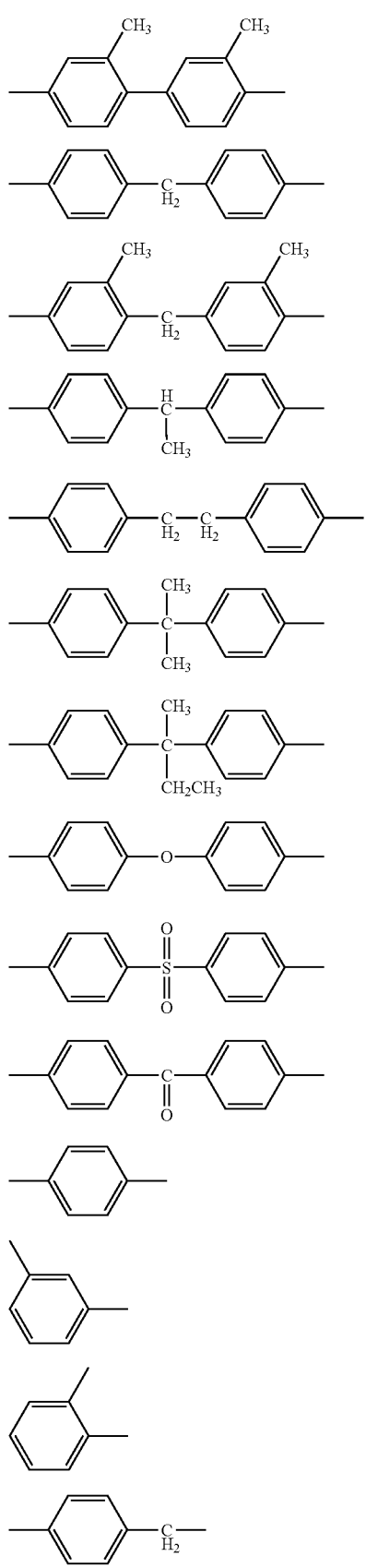

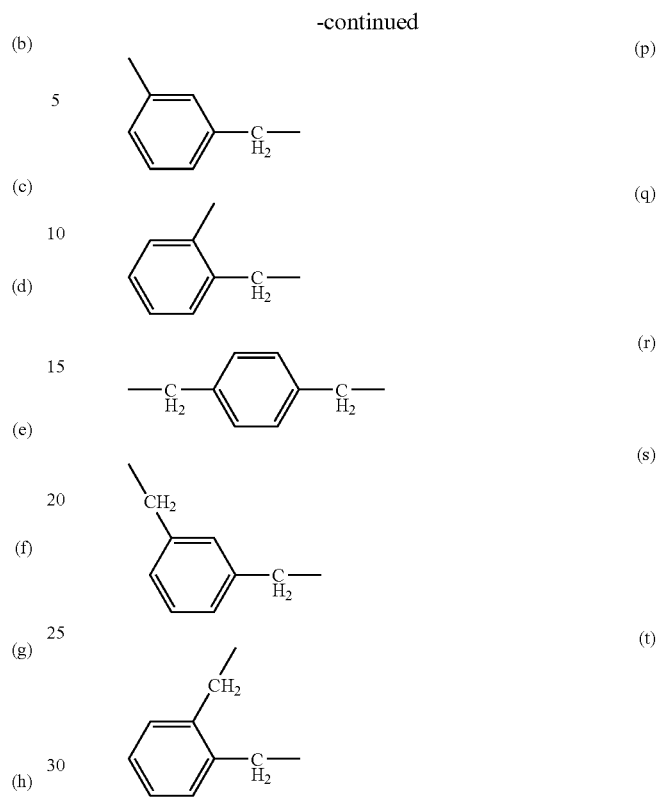

In view of melt moldability, affinity with the polyester, etc., a polyetherimide with an ether bond contained in a polyimide component as represented by the following general formula is especially preferred.

[Chemical formula 5]

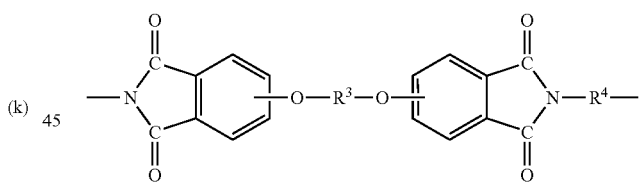

(where $R^3$ denotes a divalent aromatic or aliphatic residue with 6 to 30 carbon atoms; and $R^4$ denotes a divalent organic group selected from the group consisting of a divalent aromatic residue with 6 to 30 carbon atoms, alkylene group with 2 to 20 carbon atoms, cycloalkylene group with 2 to 20 carbon atoms, and polydiorganosiloxane group chain-terminated by an alkylene group with 2 to 8 carbon atoms.)

Examples of $R^3$ and $R^4$ include the aromatic residues represented by the following formulae.

[Chemical formulae 6]

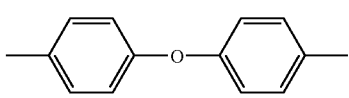

-continued

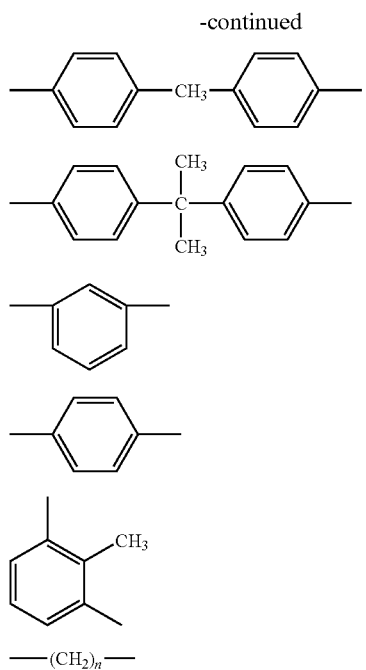

In this invention in view of the affinity with the polyester, cost, melt moldability, etc., a polymer with recurring units represented by the following formula, as a condensation product of 2,2-bis[4-(2,3-dicarboxyphenoxy)phenyl]propane dianhydride and m-phenylenediamine or p-phenylenediamine, is preferred.

and the other surface is required to be rough for assuring the carrying when the film is produced or processed and also for ensuring the running properties and running durability of the magnetic tape. For these reasons, it is preferred that the polyester film is a laminated film consisting of two or more layers.

To let the surface of the polyester film have slipperiness, wear resistance, scratch resistances etc., the polyester film can contain inorganic particles or organic particles, for example, inorganic particles such as clay, mica, titanium oxide, calcium carbonate, kaolin, talc, wet-process silica, dry-process silica, colloidal silica, calcium phosphate, barium sulfate, alumina or zirconia, or organic particles with an acrylic acid, styrene-based resin, thermosetting resin, silicone or imide-based compound, etc. as the component, particles precipitated by the catalyst, etc. added for polyester producing reaction (internally generated particles), etc. The particle size of the particles can be examined using TEM, etc., and the added amount of particles can be examined by an X-ray microanalyzer, pyrolysis gas chromatography mass spectrometry, etc.

In this invention, the thickness of the substrate can be decided appropriately in response to each application, and for application to an ordinary magnetic recording medium, it is preferred that the thickness is 2 to 7 μm. If the thickness is smaller than 2 μm, the magnetic tape obtained by using the substrate may decline in electromagnetic conversion properties. In the case where the thickness is larger than 7 μm, since the length per tape is short, it may be difficult to reduce the size of the magnetic tape and to enhance the capacity of the magnetic tape. Therefore, for application to a high density magnetic recording medium, it is preferred that the lower limit of the thickness is 3 μm, and more preferred is 4 μm. It is preferred that the upper limit is 6.5 μm, and more preferred

[Chemical formula 7]

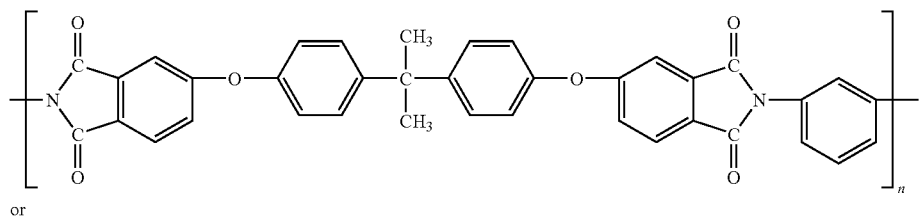

or

[Chemical formula 8]

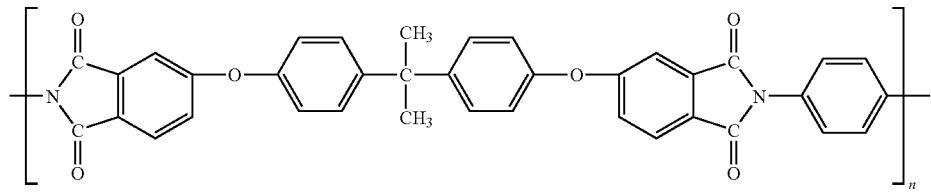

(where n denotes an integer of 2 or more, preferably an integer of 20 to 50.)

This polyetherimide is available under a trade name of "Ultem" (registered trademark) from GE Plastics.

In this invention, it is preferred that the polyester film is a laminated film consisting of two or more layers. Especially since the substrate of this invention is used for a magnetic recording medium, one surface is required to be smooth for obtaining excellent electromagnetic conversion properties, is 6 μm. A more preferred range is 3 to 6.5 μm, and a further more preferred range is 4 to 6 μm.

Further, it is preferred that the thickness of the polyester film used to constitute the substrate of this invention is 2 to 6 μm. In the case where the thickness is smaller than 2 μm, since the magnetic tape obtained by using the substrate is not firm, the electromagnetic conversion properties may decline. It is more preferred that the lower limit of the thickness of the polyester film is 3 μm, and further more preferred is 4 μm. On the other hand, in the case where the thickness of the polyester film is larger than 6 µm, since the length per tape is short, it may be difficult to reduce the size of the magnetic tape or enhance the capacity of the magnetic tape. It is more preferred that the upper limit of the thickness of the polyester film is 5.8 µm, and further more preferred is 5.6 µm. A more preferred range is 3 to 5.8 µm, and a further more preferred range is 4 to 5.6 µm.

The magnetic recording medium substrate as described above can be produced, for example, as described below.

At first, the polyester film used to constitute the substrate is produced. To produce the polyester film, for example, an extruder is used to melt the pellets of the polyester and to discharge the molten polyester from the die, and the extruded polyester is cooled and solidified to form a sheet. In this case, it is preferred to filter the polymer using a fiber stainless steel filter for removing the unmolten material in the polymer. Further, to let the surface of the polyester film have slipperiness, wear resistance, scratch resistance, etc., it is also preferred to add inorganic particles or organic particles, for example, inorganic particles such as clay, mica, titanium oxide, calcium carbonate, kaolin, talc, wet-process silica, dry-process silica, colloidal silica, calcium phosphate, barium sulfate, alumina or zirconia, or organic particles with an acrylic acid, styrene-based resin, thermosetting resin, silicone or imide-based compound, etc. as the component, particles precipitated by the catalyst, etc. added for polyester producing reaction (internally generated particles), etc. Furthermore, various additives such as a compatibilizing agent, plasticizer, weather resisting agent, antioxidant, thermal stabilizer, slip agent, antistatic agent, brightening agent, colorant, conducting agent, crystal nucleating agent, ultraviolet light absorber, flame retarder, flame retarding aid, pigment, dye, etc., to such an extent that this invention is not impaired.

In succession, said sheet is stretched biaxially in the machine direction and the transverse direction and heat-treated. The stretching process is not especially limited, but it is preferred to stretch in two or more steps in each direction. That is, a method of performing second longitudinal stretching and second lateral stretching is preferred, since a film with a high strength the most suitable for a high density recording magnetic tape can be easily obtained.

The stretching methods include a sequential biaxial stretching method in which stretching in the machine direction is followed by stretching in the transverse direction, a simultaneous biaxial stretching method in which the stretching in the machine direction and the stretching in the transverse direction are performed simultaneously using a simultaneous biaxial tenter, etc., and a combination consisting of a sequential biaxially stretching method and a simultaneous biaxial stretching method.

Especially it is preferred to use a simultaneous biaxial stretching method. Compared with a sequential biaxial stretching method, a simultaneous biaxial stretching method allows crystals to grow uniformly in the machine direction and the transverse direction in the film forming process, and stretching at a high ratio can be easily and stably performed. Meanwhile, the simultaneous biaxial stretching method in this specification means a stretching method including a step when the stretching in the machine direction and the stretching in the transverse direction take place simultaneously. It is not necessarily required that the stretching in the machine direction and the stretching in the transverse direction take place simultaneously throughout the process. In the method, it is permitted that the stretching in the machine direction alone begins at first, that the stretching in the transverse direction begins while the stretching in the machine direction continues (simultaneous stretching), that the stretching in the machine direction alone ends while the stretching in the transverse direction continues, and that the stretching in the transverse direction alone ends. A preferred stretching apparatus is, for example, a simultaneous biaxial stretching tenter, etc., and above all, a linear motor-driven simultaneous biaxial stretching tenter is especially preferred, since the film can be stretched without being broken.

The polyester film obtained as described above then has layers containing a metallic oxide (layers M) formed on both the surfaces, one layer on each surface. In this case, the oxidation state of the metallic oxide is controlled to keep the values of the total light transmittance and the surface resistivity in the respective ranges stated before. As the method for forming the layers M, a physical vapor deposition method or a chemical vapor deposition method can be used. The physical vapor deposition method for a polyester film can be a vacuum evaporation method or sputtering method. Especially in view of easy control of oxidation degree, a vacuum evaporation method is preferred. Further, an electron beam vapor deposition method is preferred, since the metal vapor can have higher energy.

To control the oxidation degree of the metallic oxide used to constitute the layers M, it is basically necessary to control the amount of the metal vapor and the introduced amount of oxygen gas. If the introduced amount of oxygen gas is decreased with the amount of the metal vapor kept constant, the oxidation degree declines, and if the introduced amount of oxygen gas is increased, the oxidation degree rises. On the contrary, if the amount of the metal vapor is decreased with the introduced amount of oxygen gas kept constant, the oxidation degree rises, and if the amount of the metal vapor is increased, the oxidation degree declines.

In this case, it is preferred that oxygen gas is supplied in the same direction as the direction of metal vapor flow from a lateral side of the evaporation source. If oxygen gas is supplied in the same direction as the direction of metal vapor flow, the oxygen gas little disturbs the metal vapor, and it is easy to control the thickness and the oxidation degree as desired. Further, since the space in which oxygen gas and the metal vapor react with each other becomes large, the oxidation reaction can be accomplished before they reach the polyester film, and a stable vapor deposition layer free from structural defects can be formed to improve dimensional stability. In the case where oxygen supply nozzles are installed at the general position (FIG. 3, 124) close to the cooling drum, since the gas flow hits the metal vapor perpendicularly, the control for obtaining a desired thickness is difficult, and it is especially difficult to form a thick layer. Further, since the reaction space is small, the metal atoms undergoing an imperfect oxidation reaction reach the polyester film, and since an imperfect structure is formed, the dimensional stability becomes poor. Furthermore, since the oxygen supply nozzles are located at the portions where the deposition starts and ends on the polyester film, a layer structure in which the oxygen concentration is high at the interface with the polyester film and on the surface of the layer M is likely to be formed. If the layer M contains layers different in composition, the structure is likely to be disturbed and the dimensional stability tends to decline.

On the contrary, the position of the oxygen supply nozzle employed in the present application is not usually employed for such reasons that since the position is inevitably apart from the cooling drum, the unreactive oxygen gas is likely to fill the chamber, to lower the pressure reduction degree and that the molten metal in the crucible is oxidized on the surface. Especially in the case where a thin layer of 50 nm or less is formed, since the amount of the metal vapor is small, the problem becomes remarkable, and it is difficult to control the oxidation degree finely. However, in the present application, since the oxidation degree is controlled with a layer thickness of 50 nm or more, the amount of the metal vapor is so large as to allow good reaction with oxygen gas, and the unreactive oxygen gas likely to lower the pressure reduction degree is not generated. Further, since melting and evaporation immediately take place on the surface of the crucible, the problem of surface oxidation can be avoided.

Since the total light transmittance is higher when the oxidation degree is higher, it can be controlled by adjusting the amount of oxygen gas introduced for vapor deposition, the position of the oxygen gas supply nozzle, the evaporated amount of the metal ingredient and the film carrying speed. Particularly in the case where the total light transmittance is enhanced by raising the oxidation degree, the introduced amount of oxygen gas is increased to increase the oxygen gas used for the reaction; or the oxygen gas supply nozzle is installed at a position likely to allow easy reaction to promote the reaction; or the evaporated amount of the metal ingredient is decreased to enhance the oxygen concentration; or the film carrying speed is lowered to elongate the reaction period of time. Especially the introduced amount of oxygen gas is very influential.

The surface resistivity is also higher if the oxidation degree is higher. So, as in the case of total light transmittance, the surface resistivity can also be controlled by adjusting the amount of oxygen gas introduced for vapor deposition, the position of the oxygen gas supply nozzle, the evaporated amount of the metal ingredient and the film carrying speed. Especially the evaporated amount of the metal and the film carrying speed are very influential.

The total light transmittance and the surface resistivity have correlation with the metal element concentration in the layers M, but they also change depending on the bonding state of metal atoms even if the metal element concentration remains the same. Especially the abundance ratio of metal-metal bonds is influential.

Further, the center-line mean roughness Ra on the surface of the substrate can be kept within said range by changing the surface roughness of the polyester film. The mean roughness can also be controlled by changing the metal ingredient used and the thickness and oxidation degree of the layers M. The surface of the polyester film can be made rougher by increasing the particle size or added amount of the inert particles. If the surface is made rougher, the center-line mean roughness Ra of the surface of the substrate becomes larger. Even by increasing the thickness of the layers M, the center-line mean roughness Ra of the surface of the substrate becomes larger. If the thickness of the layers M is made larger, the structure of the layers M is likely to be a columnar structure, and locally deposited and grown columns make the surface rougher. Moreover, even if the oxidation degree is enhanced as described before, the center-line mean roughness Ra of the surface of the substrate can be made larger. Above all, the thickness of the layers M is very influential.

The humidity expansion coefficient of the substrate can be controlled by selecting the metal ingredient of the layers M or adjusting the thickness, oxidation degree, metal element concentration or the bonding state of metal atoms of the layers M.

The Young's modulus of the substrate in the machine direction is decided virtually by the Young's modulus of the polyester film in the machine direction. On the other hand, the Young's modulus of the substrate in the transverse direction is also decided virtually by the Young's modulus of the polyester film in the transverse direction. Therefore, it is only required to control the Young's moduli of the polyester film in the machine and transverse directions. The Young's modulus of the polyester film can be controlled by adjusting the stretching ratio and the stretching temperature. Basically, if the total area stretching ratio is enhanced or if the stretching temperature is lowered, the Young's modulus of the produced polyester film can be enhanced.

Further, the Young's modulus of the substrate can also be controlled by selecting the metal ingredient used in the layers M or adjusting the thickness and oxidation degree of the layers M. If the layers M per se are enhanced in strength or made larger in thickness, the Young's modulus of the substrate can be enhanced.

The dimensional stability of a magnetic recording medium is affected by the humidity expansion coefficient and Young's modulus of the substrate. Especially the humidity expansion coefficient is very influential. That is, the composition control of the layers M is very important for improving dimensional stability.

Meanwhile, in this invention, the polyester film or the substrate obtained by using the polyester film can be, as required, processed arbitrarily by heat treatment, microwave heating, molding, surface treatment, lamination, coating, printing, embossing, etching or the like.

The method for producing the substrate of this invention is explained below in reference to a typical case of using polyethylene terephthalate (PET) as the polyester. Of course, the present application is not limited to the substrate obtained by using the PET film, and can also be applied to the substrate obtained by using another polymer. For example, in the case where a polyester film is produced by using polyethylene-2, 6-naphthalenedicarboxylate, etc. with a high glass transition temperature and a high melting point, extrusion and stretching can be performed at temperatures higher than those stated below.

At first, polyethylene terephthalate is prepared. Polyethylene terephthalate can be produced by either of the following processes: (1) a process in which terephthalic acid and ethylene glycol are used as raw materials to directly perform an esterification reaction, for obtaining polyethylene terephthalate with a low molecular weight or an oligomer, and subsequently antimony trioxide or a titanium compound is used as a catalyst to perform a polycondensation reaction, for obtaining the intended polymer, or (2) a process in which dimethyl terephthalate and ethylene glycol are used as raw materials, to perform an ester interchange reaction, for obtaining a low molecular weight material, and subsequently antimony trioxide or a titanium compound is used as a catalyst to perform a polycondensation reaction, for obtaining the intended polymer. In the former process, the esterification can be performed even without any catalyst, but the ester interchange reaction is usually performed using a compound of manganese, calcium, magnesium, zinc, lithium or titanium, etc. as a catalyst, and after substantial completion of the ester interchange reaction, a phosphorus compound may be added for the purpose of inactivating the catalyst used in the reaction.

In the case where the polyester used to form the film is made to contain inert particles, preferred is a method of dispersing the inert particles into ethylene glycol at a predetermined ratio to form a slurry and adding the polyethylene glycol slurry when polymerization is performed. In the addition of inert particles, if the particles obtained, for example, as a water sol or alcohol sol when the inert particles are synthesized are added without once drying them, they can be well dispersed. Further, a method of mixing an aqueous slurry of inert particles directly with PET pellets and kneading the inert particles into PET using a vented double screw kneading extruder is also effective. An effective method for adjusting the inert particle content is to prepare master pellets containing the inert particles at a high concentration by the above method and to dilute the master pellets with PET not substantially containing the inert particles for adjusting the inert particle content when the film is formed.

Then, the obtained PET pellets are dried at 180° C. under reduced pressure for 3 hours or more, and supplied into an extruder heated at 270 to 320° C. in a nitrogen stream or under reduced pressure without lowering the intrinsic viscosity. The mixture is then extruded from a slit die, and the extruded sheet is cooled on a casting roll, to obtain a cast film. In this case, to remove any foreign matter and modified polymer, it is preferred to use any of various filters, for example, a filter made of such a material as a sintered metal, porous ceramic, sand or wire gauze. Further, as required, a gear pump can also be used for enhancing the capability of supplying at a constant rate. In the case where films are laminated, two or more extruders and a manifold or joint block are used to melt and laminate plural different polymers.

Then, the cast film is introduced into a simultaneously biaxially stretching tenter and is simultaneously biaxially stretched in the machine and transverse directions. It is preferred that the stretching rate is in a range from 100 to 20,000%/min in both the machine and transverse directions. A more preferred range is 500 to 10,000%/min, and a further more preferred range is 2,000 to 7,000%/min. In the case where the stretching rate is smaller than 100%/min, since the film is exposed to heat for a longer period of time, it can happen that especially edge portions are crystallized to cause stretch breaking, for lowering the film formability, or that since molecular orientation does not progress sufficiently, the produced film may decline in Young's modulus. Further, if the stretching rate is larger than 20,000%/min, the inter-molecular entanglement is likely to be produced at the time of stretching, to lower stretchability, and stretching at a high ratio may become difficult.

The stretching temperature for the first step can be decided in reference to the glass transition temperature Tg of the cast film, though depending on the polymer used. It is preferred that the temperature in the first stretching step in the machine direction and the transverse direction is in a range from Tg to Tg+30° C. A more preferred range is Tg+5° C. to Tg+20° C. If the stretching temperature is lower than said range, film breaking may occur frequently to lower productivity or the second stretchability may decline, making it difficult to stably stretch at a high ratio. Further, if the stretching temperature is higher than said range, it can happen that especially edge portions are crystallized to cause stretch breaking, for lowering the film formability or that since molecular orientation does not progress sufficiently, the produced film may decline in Young's modulus.

The stretching ratio depends on the polymer used and the stretching temperature and also depends on multi-step stretching. However, it is preferred that the total area stretching ratio (total longitudinal stretching ratio×total lateral stretching ratio) is in a range from 20 to 40 times. A more preferred range is 25 to 35 times. It is preferred that the total stretching ratio in one direction of either the machine direction or the transverse direction is 2.5 to 8 times. A more preferred range is 3 to 7 times. If the stretching ratio is smaller than said range, stretching irregularity, etc. may occur to lower the processability of the film. Further, if the stretching ratio is larger than said range, stretch breaking may occur frequently to lower productivity. Meanwhile, in the case where stretching is performed in plural steps in each direction, it is preferred that the stretching ratio of the first step in the machine direction and the transverse directions is 2.5 to 5 times respectively. A more preferred range is 3 to 4 times. Furthermore, a preferred area stretching ratio of the first step is 8 to 16 times, and a more preferred range is 9 to 14 times. The stretching ratio values are suitable especially when a simultaneous biaxially stretching method is employed, but they can also be applied to a sequential biaxially stretching method.

In the case where the method for producing the polyester film of this invention is multi-step stretching, that is, includes a second stretching step, it is preferred that the stretching temperature of the second step is Tg+40° C. to Tg+120° C. A more preferred range is Tg+60° C. to Tg+100° C. (Meanwhile, in the case where the third stretching is performed, it is desirable that the stretching temperature of the second step is relatively lower within said temperature range.) In the case where the stretching temperature is lower or higher than said range, the quantity of heat may be insufficient or crystallization progresses excessively, and it can happen that film breaking occurs frequently to lower productivity or that since orientation cannot be enhanced sufficiently, the strength declines. Moreover, in the case where the third stretching is performed, it is preferred that the stretching temperature of the third step is higher than the stretching temperature of the second step and lower than the temperature of the heat treatment described later. Meanwhile, if the third stretching is performed, Young's modulus and thermal dimensional stability are likely to be improved.

Further, in the case of second stretching, it is preferred that the stretching ratio in one direction is 1.05 to 2.5 times. A more preferred range is 1.2 to 1.8 times. It is preferred that the area stretching ratio of second stretching is 1.4 to 4 times. A more preferred range is 1.9 to 3 times. In the case where third stretching is further performed, it is preferred that the stretching ratio of the third step (in one direction) is 1.05 to 1.2 times and that the area stretching ratio is 1.1 to 1.4 times.

In succession, the stretched film is heat-treated with tension or with relaxation in the transverse direction. The heat treatment conditions depend on the polymer used, but it is preferred that the heat treatment temperature is 150 to 230° C. and that the heat treatment time is in a range from 0.5 to 10 seconds. Further, to improve the vapor deposition properties, it is preferred that the heat treatment temperature is in a relatively low temperature range from 160° C. to 190° C., and that the heat treatment time is also in a relatively short time range from 0.5 to 2 seconds. If these conditions are employed, the adhesion of the polyester film to the cooling drum can be improved, and the wrinkles, breaking, etc. due to heat can be avoided. Furthermore, it is preferred that the prepared polyester film is stored in an environment of low humidity lest the prepared polyester film should absorb moisture. For transport, etc., it is preferred that the polyester film is packaged to avoid moisture absorption as far as possible. The moisture absorbed by the polyester film adversely affects the formation of the layers M.

The method for forming the metallic oxide-containing layers (layers M) on both the surfaces of the polyester film obtained as described above is explained below.

To form the layers M on the surfaces of the polyester film, for example, a vacuum evaporator as shown in FIG. 2 is used. In the vacuum evaporator 11, the polyester film runs from an unwinding roll portion 13 along a cooling drum 16 to a winding roll portion 18 in a vacuum chamber 12. In this state, a metallic material 19 in a crucible 23 is heated and evaporated by an electron beam 21 emitted from an electron gun 20, and oxygen gas is introduced from an oxygen supply nozzle 24, to perform an oxidation reaction with the evaporated metal for depositing the vapor on the polyester film on the cooling drum 16. In this invention, since it is necessary to form the layers M on both the surfaces of the polyester film, the polyester film with the metallic oxide deposited on one surface (the first surface) is removed from the winding roll portion 18 and set on the unwinding roll portion 13, to deposit the metallic oxide on the other surface (the second surface) similarly. In the vacuum evaporator 11, the oxygen supply nozzle 24 is installed on a lateral side of the crucible 23 provided as an evaporation source, so that oxygen gas may flow in the same direction as that of the metal vapor. As a result, the space for the reaction between the metal vapor and oxygen gas is large.

It is preferred that the vacuum chamber 12 is internally kept at a reduced pressure of $1.0 \times 10^{-8}$ to $1.0 \times 10^2$ Pa. To form compact layers M with little deteriorated portions, it is preferred that the reduced pressure is 1.0 to $10^{-6}$ to $1.0 \times 10^{-1}$ Pa.

It is preferred that the surface temperature of the cooling drum 16 is kept in a range from −40 to 60° C. A more preferred range is −35 to 30° C., and a further more preferred range is −30 to 0° C.

It is preferred that the output of the electron beam 21 is kept in a range from 2.0 to 8.0 kW. A more preferred range is 3.0 to 7.0 kW, and a further more preferred range is 4.0 to 6.0 kW. Meanwhile, the crucible can also be directly heated for heating and evaporating the metallic material 19.

Oxygen gas is introduced into the vacuum chamber 12 at a flow rate of 0.5 to 10 L/min using a gas flow rate controller 26. A more preferred range is 1.5 to 8 L/min, and a furthermore preferred range is 2.0 to 5 L/min.

It is preferred that the carrying speed of the polyester film in the vacuum chamber 12 is 20 to 200 m/min. A more preferred range is 30 to 100 m/min, and a further more preferred range is 40 to 80 m/min. If the carrying speed is lower than 20 m/min, it is necessary to keep the evaporated amount of the metal very small for controlling the thickness of the layers M as described before. So, the introduced amount of oxygen gas must also be decreased, to make the control of the oxidation degree very difficult. If the carrying speed is higher than 200 m/min, the contact time with the cooling drum is so short that the breaking and wrinkling are caused by heat, to lower the productivity. Further, the layers insufficient in the state of reaction between the metal vapor and oxygen gas are likely to be formed, making the control of the oxidation degree difficult.

It is preferred that the carrying tension of the polyester film in the vacuum chamber 12 is 50 to 150 N/m. A more preferred range is 70 to 120 N/m, and a further more preferred range is 80 to 100 N/min. However, it is preferred that the carrying tension for vapor deposition on the second surface is lower than that for vapor deposition on the first surface. It is preferred that the carrying tension for the second surface is lower than that for the first surface by 5 to 30 N/m. Being lower by 7 to 25 N/m is more preferred, and being lower by 10 to 20 N/m is furthermore preferred. The reason is that the polyester film loses its force to shrink owing to the heat load acting when the metal vapor is deposited on the first surface, and that if the polyester film is made to run at the same carrying tension as that for the first surface when the metal vapor is deposited on the second surface, breaking and wrinkling are caused by the heat, to lower productivity. Further, in the case where the surface roughness of one surface of the polyester film is different from that of the other surface, it is preferred to deposit the metal vapor on the rougher surface at first. The reason is that when the metal vapor is deposited on the second surface, the adhesion of the film to the cooling drum can be enhanced. The metal vapor can be deposited surface by surface or on both the surfaces in one step.

For stabilizing the layers M and enhancing their compactness after vapor deposition, it is preferred to return the pressure in the vacuum evaporator to atmospheric pressure and to rewind the wound film. Especially in order to decrease unbound atoms, it is preferred to rewind with humidification for elongating the chance of contact between water vapor and the layers M. It is preferred to rewind with humidification at 20 to 40° C. and at 60 to 80% RH. Aging at a temperature of 20 to 50° C. for 1 to 3 days is preferred, and aging at a humidity of 60% or more in an environment not causing dew condensation is further preferred.

The method for producing a magnetic recording medium is explained below. The magnetic recording medium substrate obtained as described above is slit, for example, to a width of 0.1 to 3 m, and while the slit substrate is carried at a speed of 20 to 300 m/min at a tension of 50 to 300 N/m, it is coated with a magnetic paint and a nonmagnetic paint in layers on one surface (A) by an extrusion coater. Meanwhile, the magnetic paint is made to form an upper layer with a thickness of 0.1 to 0.3 μm, and the nonmagnetic paint is made to form a lower layer with a thickness of 0.5 to 1.5 μm. Subsequently, the substrate coated with the magnetic paint and the nonmagnetic paint is magnetically oriented and dried at a temperature of 80 to 130° C. Then, the substrate is coated with a back coating layer with a thickness of 0.3 to 0.8 μm on the other surface (B), treated by a calender and wound. The calender treatment is performed using a small test calender (five steel/nylon rolls) at a temperature of 70 to 120° C. and at a line pressure of 0.5 to 5 kN/cm. Then, the substrate is treated at 60 to 80° C. for to 72 hours for aging, and slit to a width of ½ inch (1.27 cm), for preparing a pancake. A specific length of the pancake is assembled into a cassette, to obtain a cassette tape as a magnetic recording medium.

The compositions of the magnetic paint, etc. can be, for example, as follows.

| (Composition of a magnetic paint) | |
|---|---|
| Ferromagnetic metal powder: | 100 parts by weight |
| Modified vinyl chloride copolymer: | 10 parts by weight |
| Modified polyurethane: | 10 parts by weight |
| Polyisocyanate: | 5 parts by weight |
| 2-ethylhexyl oleate: | 1.5 parts by weight |
| Palmitic acid: | 1 part by weight |
| Carbon black: | 1 part by weight |
| Alumina: | 10 parts by weight |
| Methyl ethyl ketone: | 75 parts by weight |
| Cyclohexanone: | 75 parts by weight |
| Toluene: | 75 parts by weight |
| (Composition of a back coating layer) | |
| Carbon black (average particle size 20 nm): | 95 parts by weight |
| Carbon black (average particle size 280 nm): | 10 parts by weight |
| Alumina: | 0.1 part by weight |
| Modified polyurethane: | 20 parts by weight |
| Modified vinyl chloride copolymer: | 30 parts by weight |
| Cyclohexanone: | 200 parts by weight |
| Methyl ethyl ketone: | 300 parts by weight |
| Toluene: | 100 parts by weight |

The magnetic recording medium can be suitably used for data recording, particularly for backing up computer data (LTO4, LTO5, etc.) and recording videos, digital images, etc.

(Methods for Measuring Physical Properties and Methods for Evaluating Effects)

The methods for measuring property values and methods for evaluating effects in this invention are as described below.

For example, for taking out the substrate of the present application from a magnetic tape, methyl ethyl ketone can be used to wipe off the magnetic layer and the back coating layer, for allowing the evaluation of the substrate.

(1) Thickness of a Layer M

A cross section is observed under the following conditions, and the thicknesses [nm] at 9 points in total are measured and averaged for use as the thickness [nm] of the layer M.

Measuring instrument: Transmission electron microscope (TEM), H-7100FA produced by Hitachi
Test condition: Acceleration voltage 100 kV
Measuring magnification: 200,000×
Specimen preparation: Very thin section
Observed face: TD-ZD cross section
Measuring times: Measured at three points per visual field in three visual fields (2) Analysis of Composition A composition is analyzed in the depth direction under the following conditions. The depth at which the carbon concentration exceeds 50 at % is defined as the interface between the layer M and the polyester film, and the portion from the surface layer to the interface is divided into five equal sections. The central point of each of the sections is selected as the measuring point to analyze the composition. From the obtained compositions of the respective measuring points, the mean values are calculated to obtain the average composition referred to in this invention.

Measuring instrument: X-ray photoelectron spectroscope, Quantera-SXM produced by PHI, USA
Exciting X-ray: Monochromatic AlK$\alpha$1,2 line (1486.6 eV)
X-ray diameter: 100 [μm]
Photoelectron exit angle: 45°
Raster area: 2×2 [mm]
Ar ion etching: 2.0 [kV], $1.5 \times 10^{-7}$ [Torr]
Sputtering rate: 3.68 nm/min (as $Si_2O$)
Data processing: 9-point smoothing From the bond energy values of peaks, element information can be obtained, and the area ratio of the respective peaks is used to determine the proportion of the composition (at %). Further, the peak of the metal element can be divided into the peaks of respective bond states (metal-oxygen, metal-hydroxyl group, metal-metal, etc.), and the area ratio of the peaks of the respective bond states can be used to determine the abundance ratios of the bond states [at %]. For example, in the case where the metal ingredient of the layer M is aluminum, the peak of the metal element can be divided into four bond states; metal bond (Al—Al), aluminum-oxygen bond ($Al_2O_3$), aluminum-oxygen-hydroxyl group bond (AlOOH) and aluminum hydroxyl group bond ($Al(OH)_3$). The abundance ratio of the aluminum bound to hydroxyl groups in the present application refers to the abundance ratio of the fourth bond state of aluminum-hydroxyl group bond ($Al(OH)_3$).

Meanwhile, for the division of a peak into bond states, see "Handbook of Monochromatic XPS Spectra (written by B. Vincent Crist, October, 2000, published by Wiley).

(3) Total Light Transmission

The total light transmittance is measured according to JIS K 7105 (1981) using the following measuring instrument. The measurement is made 5 times, and the mean value is employed as the total light transmittance of this invention.

Measuring instrument: Direct reading haze meter HGM-2DP (for light source C), produced by Suga Test Instruments Co., Ltd.
Light source: Halogen lamp 12V, 50W
Light receiving characteristics: 395 to 745 nm
Test environment: Temperature 23° C., humidity 65% RH
Number of measuring times: 5

(4) Surface Resistivity

It is necessary to use a measuring instrument suitable for the range of surface resistivity values to be measured. At first, a sample is measured according to the following method i), and if the surface resistivity of the sample is too low to be measured, the sample is measured according to the following method ii). The measurement is made 5 times, and the mean value is employed as the surface resistivity of the present invention.

i) High Resistivity Measurement

The following measuring instrument is used for measurement according to JIS C 2151 (1990).

Measuring instrument: Very high resistance/micro-current digital meter R8340 produced by Advantest Corp.
Applied voltage: 100 V
Application time: 10 seconds
Unit of measured value: Ω
Test environment: Temperature 23° C., humidity 65% RH
Number of measuring times: 5 ii) Low Resistivity Measurement

The following measuring instrument is used for measurement according to JIS K 7194 (1994).

Measuring instrument: Loresta-EP MCP-T360 produced by Mitsubishi Chemical Corp.
Test environment: Temperature 23° C., humidity 65% RH
Number of measuring times: 5

(5) Center-Line Mean Roughness Ra

A stylus surface roughness meter is used to measure the center-line mean roughness Ra under the following conditions. The film surface is scanned in the transverse direction 20 times for measurement, and the mean value of the obtained results is employed as the center-line mean roughness Ra of this invention.

Measuring instrument: High precision thin film step measuring instrument ET-10 produced by Kosaka Laboratory Ltd.
Stylus tip radius: 0.5 μm
Stylus load: 5 mg
Measuring length: 1 mm
Cutoff value: 0.08 mm
Test environment: Temperature 23° C., humidity 65% RH (6) Humidity Expansion Coefficient The measurement is made 3 times under the following conditions. The mean value of the measured results is employed as the humidity expansion coefficient of this invention.

Measuring instrument: Tape elongation tester produced by Ohkura Industry K.K.
Sample size: Width 10 mm, gauge length 200 mm
Load: 10 g
Number of measuring times: 3
Test temperature: 30° C.
Test humidity: The sample is kept at 40% RH for 6 hours, and its dimension is measured. The humidity is raised up to 80% RH at a rate of 1 [% RH/min], and the sample is kept at 80% RH for 6 hours. The dimensional change ΔL [mm] is measured, and the humidity expansion coefficient [ppm/% RH] is calculated from the following formula:

$$\text{Humidity expansion coefficient [ppm/\% } RH] = 10^6 \times \{(\Delta L/200)/(80-40)\}$$

(7) Young's Modulus

The Young's modulus is measured according to ASTM-D882 (1997). An Instron type tensile testing machine is used to measure 5 times under the following conditions. The mean value of the measured results is employed as the Young's modulus of this invention.

Measuring instrument: Automatic film strength and elongation measuring instrument "Tensilon AMF/RTA-100" produced by Orientec Co., Ltd.
Sample size: Width 10 mm, gauge length 100 mm
Stress rate: 200 mm/min
Test environment: Temperature 23° C., humidity 65% RH
Number of measuring times: 5 times, to calculate the mean value (8) Intrinsic Viscosity The solution viscosity is measured in orthochlorophenol at 25° C., and the intrinsic viscosity is calculated based on the solution viscosity from the following formula:

$$\eta_{sp}/C=[\eta]+K[\eta]^2 \cdot C$$

where $\eta_{sp}$=(solution viscosity/solvent viscosity)−1; C is the weight of the polymer dissolved per 100 ml of the solvent (g/100 ml, usually 1.2); and K is Huggins' constant (0.343). The solution viscosity and the solvent viscosity are measured using an Ostwald viscometer.

(9) Glass Transition Temperature (Tg)

The specific heat is measured using the following instrument under the following conditions, and the glass transition temperature is decided according to JIS K 7121 (1987).

Instrument: Temperature modulated DSC produced by TA Instrument
Test Conditions:
Heating temperature: 270 to 570 K (RCS cooling method)
Temperature calibration: Melting points of highly pure indium and tin
Temperature modulation amplitude: ±1 K
Temperature modulation period: 60 seconds
Heating step: 5 K
Sample weight: 5 mg
Sample container: Open container made of aluminum (22 mg)
Reference container: Open container made of aluminum (18 mg)

Meanwhile, the glass transition temperature is calculated from the following formula:

Glass transition temperature=(Extrapolated glass transition initiation temperature+extrapolated glass transition end temperature)/2

(10) Crack Resistance

The sample is stretched by a tensile tester at each specific elongation value and the surface state is observed with a differential interference microscope respectively under the following conditions.

Tensile Tester:
Measuring instrument: Automatic film strength and elongation measuring instrument "Tensilon AMF/RTA-100" produced by Orientec Co., Ltd.
Sample size: Width 10 mm, gauge length 100 mm
Stress rate: 10%/min
Tensile elongation percentage: 0.5% to 10% (the tensile tester is stopped at the predetermined elongation percentage concerned)
Test environment: Temperature 23° C., humidity 65% RH
Differential Interference Microscope:
Measuring instrument: Leica DMLB HC produced by Leica Microsystems
Observation magnification: 1000×

A sample stretched to an elongation percentage of 0.9% is prepared, and 10 visual fields are observed at random. A sample showing cracks in 8 or more visual fields is judged to have no crack resistance. If no cracking is observed, the elongation percentage is increased, and a sample stretched to a higher elongation percentage, which allows the observation of cracking, is identified. The crack resistance is evaluated according to the following criterion. A sample corresponding to the cross mark is rejected.

Double circle: Cracking occurs at an elongation percentage of 5% or more.
Single circle: Cracking occurs at an elongation percentage of 2% to less than 5%.
Triangle: Cracking occurs at an elongation percentage of 1% to less than 2%.
Cross: Cracking occurs at an elongation percentage of less than 1%.

(11) Width Dimension Measurement

A substrate obtained by slitting to have a width of 1 m is carried with a tension of 20 kg/m, coated on one surface (A) with a magnetic paint and a non-magnetic paint with the following compositions in layers by an extrusion coater (the upper layer is formed of the magnetic paint and has a thickness of 0.2 μm, and the lower layer is formed of the non-magnetic paint and has a thickness of 0.9 μm), magnetically oriented, and dried at a drying temperature of 100° C. The coated substrate is then coated on the other surface (B) with a back coating layer with the following composition, calendered with a small test calender (five steel/nylon rolls) at a temperature of 85° C. and at a line pressure of 200 kg/cm, and wound. The raw tape is slit to prepare a pancake with a width of ½ inch (1.27 cm). The pancake cut to have a length of 200 m is assembled into a cassette, to prepare a cassette tape.

| (Composition of the magnetic paint) | |
|---|---|
| Ferromagnetic metal powder: [Fe:Co:Ni:Al:Y:Ca = 70:24:1:2:2:1 (ratio by weight)] [Major axis length 0.09 μm, axis ratio 6, coercive force 153 kA/m (1,922 Oe), saturation magnetization 146 Am²/kg (146 emu/g), BET specific surface area 53 m²/g, X-ray particle size 15 nm] | 100 parts by weight |
| Modified vinyl chloride copolymer (binder): (Average polymerization degree 280, epoxy group content 3.1 wt %, sulfonic acid group content 8 × 10⁻⁵ equivalent/g) | 10 parts by weight |
| Modified polyurethane (binder): (Number average molecular weight 25,000, sulfonic acid group content 1.2 × 10⁻⁴ equivalent/g, glass transition point 45° C.) | 10 parts by weight |

-continued

| | |
|---|---|
| Polyisocyanate (curing agent): | 5 parts by weight |
| (Coronate L (trade name) produced by Nippon Polyurethane Industry Co., Ltd.) | |
| 2-ethylhexyl oleate (lubricant): | 1.5 parts by weight |
| Palmitic acid (lubricant): | 1 part by weight |
| Carbon black (antistatic agent): | 1 part by weight |
| (Average primary particle size 0.018 μm) | |
| Alumina (abrasive): | 10 parts by weight |
| (α-alumina, average particle size 0.18 μm) | |
| Methyl ethyl ketone: | 75 parts by weight |
| Cyclohexanone: | 75 parts by weight |
| Toluene: | 75 parts by weight |
| (Composition of the non-magnetic paint) | |
| Modified polyurethane: | 10 parts by weight |
| (Number average molecular weight 25,000, sulfonic acid group content $1.2 \times 10^{-4}$ equivalent/g, glass transition point 45° C.) | |
| Modified vinyl chloride copolymer: | 10 parts by weight |
| (Average polymerization degree 280, epoxy group content 3.1 wt %, sulfonic acid group content $8 \times 10^{-5}$ equivalent/g) | |
| Methyl ethyl ketone: | 75 parts by weight |
| Cyclohexanone: | 75 parts by weight |
| Toluene: | 75 parts by weight |
| Polyisocyanate: | 5 parts by weight |
| (Coronate L (trade name) produced by Nippon Polyurethane Industry Co., Ltd.) | |
| 2-ethylhexyl oleate (lubricant): | 1.5 parts by weight |
| Palmitic acid (lubricant): | 1 part by weight |
| (Composition of the back coating layer) | |
| Carbon black: | 95 parts by weight |
| (Antistatic agent, average primary particle size 0.018 μm) | |
| Carbon black: | 10 parts by weight |
| (Antistatic agent, average primary particle size 0.3 μm) | |
| Alumina: | 0.1 part by weight |
| (α-alumina, average particle size 0.18 μm) | |
| Modified polyurethane: | 20 parts by weight |
| (Number average molecular weight 25,000, sulfonic acid group content $1.2 \times 10^{-4}$ equivalent/g, glass transition point 45° C.) | |
| Modified vinyl chloride copolymer: | 30 parts by weight |
| (Average polymerization degree 280, epoxy group content 3.1 wt %, sulfonic acid group content $8 \times 10^{-5}$ equivalent/g) | |
| Cyclohexanone: | 200 parts by weight |
| Methyl ethyl ketone: | 300 parts by weight |
| Toluene: | 100 parts by weight |

A tape is taken out of the cartridge of a cassette tape, and the sheet width measuring instrument fabricated as shown in FIG. 1 is placed in the following thermo-hygrostat, for measuring the width dimension. The sheet width measuring instrument shown in FIG. 1 is an instrument for measuring the transverse dimension using a laser. A magnetic tape 9 is set along free rolls 5 through 8 and is fastened in a load detector 3, a weight 4 as a load being suspended at the other end of the tape. If a laser beam 10 is oscillated to the magnetic tape 9, the laser beam 10 oscillated linearly in the transverse direction from a laser oscillator 1 is intercepted only in the portion of the magnetic tape 9, and the width of the intercepted laser portion is measured as the width of the magnetic tape. The measurement is made 3 times, and the mean value is employed as the width of this invention.

Measuring instrument: Sheet width measuring instrument produced by Ayaha Engineering Co., Ltd.
Laser oscillator 1 and light receiving portion 2: Laser dimension measuring instrument LS-5040 produced by Keyence
Load detector 3: Load cell CBEl-10K produced by NMB
Thermo-hygrostat: SE-25VL-A produced by K.K. Kato
Load 4: Weight (machine direction)
Sample size: ½ inch wide, 250 mm long
Holding time: 5 hours
Number of measuring times: 3

(Width Dimension Change Rate)

Width dimensions ($1_A$ and $1_B$) are measured under the following two conditions, and the dimension change rate is calculated from the following formula. The dimensional stability is evaluated according to the following criterion. A sample corresponding to the cross mark is rejected.

Condition A: 10° C., 10% RH, tension 1.0 N
Condition B: 29° C., 80% RH, tension 0.6 N
Width dimension change rate [ppm]=$10^6 \times \{(1_B - 1_A)/1_A\}$
Double circle: Width dimension change rate is 0 [ppm] to less than 500 [ppm].
Single circle: Width dimension change rate is 500 [ppm] to less than 800 [ppm].
Cross: Width dimension change rate is 800 [ppm] or more.

(12) Error Rate

The cassette tape prepared in the above (11) is used to record and reproduce (recording wavelength 0.55 μm) in an environment of 23° C. and 50% RH using commercially available LTO Drive 3580-L11 produced by IBM, for evaluation. The error rate is calculated from the following formula based on the error information (number of error bits) delivered from the drive. The dimensional stability is evaluated according to the following criterion. A sample corresponding to the cross mark is rejected.

Error rate=(Number of error bits)/(Number of write bits)
Double circle: Error rate is less than $1.0 \times 10^{-6}$.
Single circle: Error rate is $1.0 \times 10^{-6}$ to less than $1.0 \times 10^{-5}$.
Triangle: Error rate is $1.0 \times 10^{-5}$ to less than $1.0 \times 10^{-4}$.
Cross: Error rate is $1.0 \times 10^{-4}$ or more.

EXAMPLES

The modes for carrying out this invention are explained below based on examples. In the following description, polyethylene terephthalate is expressed as PET, and poly(ethylene-2,6-napthalene dicarboxylate) is expressed as PEN.

Reference Example 1

An ester interchange reaction vessel was charged with 194 parts by weight of dimethyl terephthalate and 124 parts by weight of ethylene glycol, and the mixture was heated at 140° C., for being dissolved. Then, while the mixture was stirred, 0.1 part by weight of magnesium acetate tetrahydrate and 0.05 part by weight of antimony trioxide were added, to perform an ester interchange reaction while methanol was distilled out at 140 to 230° C. Subsequently, 1 part by weight of 5 wt % trimethyl phosphate ethylene glycol solution (0.05 part by weight as trimethyl phosphate) was added.

When the trimethylphosphoric acid ethylene glycol solution was added, the temperature of the reaction mixture declined. So, while excess ethylene glycol was distilled away, stirring was continued till the temperature of the reaction mixture returned to 230° C. When the temperature of the reaction mixture in the ester interchange reaction vessel reached 230° C. as described above, the reaction mixture was transferred to a polymerization reactor.

After completion of transfer, the reaction system was gradually heated from 230° C. to 290° C., and the pressure was lowered to 0.1 kPa. The time taken to reach the final temperature and the time taken to reach the final pressure were 60 minutes respectively. After the final temperature and the final pressure were reached, the reaction was performed for 2 hours (for 3 hours after start of polymerization), when the stirring torque of the polymerization reactor showed a predetermined value (the particular value depends on the specification of the polymerization reactor, but the value shown by polyethylene terephthalate with an intrinsic viscosity of 0.62 in this polymerization reactor was considered as the predetermined value). So, the reaction system was purged with nitrogen, to return to atmospheric pressure, for terminating the polycondensation reaction, and a strand was discharged into cold water and immediately cut to obtain PET pellets X of polyethylene terephthalate with an intrinsic viscosity of 0.62.

Reference Example 2

A vented double-screw kneading extruder with the screws rotating in the same direction, heated to 280° C., was charged with 98 parts by weight of the PET pellets X prepared in Reference Example 1 and 20 parts by weight of an aqueous slurry containing 10 wt % of crosslinked spherical polystyrene particles with an average particle size of 0.3 μm (2 parts by weight as crosslinked spherical polystyrene), and the vent hole was kept at a vacuum degree of 1 kPa or less, to remove water, for obtaining PET pellets Y with an intrinsic viscosity of 0.62 containing 2 wt % of crosslinked spherical polystyrene particles with an average particle size of 0.3 μm.

Reference Example 3

PET pellets Z with an intrinsic viscosity of 0.62 containing 2 wt % of crosslinked spherical polystyrene particles with an average particle size of 0.8 μm were obtained according to the same method as described in Reference Example 2, except that crosslinked spherical polystyrene particles with an average particle size of 0.8 μm were used instead of the crosslinked spherical polystyrene particles with an average particle size of 0.3 μm.

Reference Example 4

Zero point zero three (0.03) part by weight of manganese acetate tetrahydrate was added to a mixture consisting of 100 parts by weight of dimethyl 2,6-naphthalenedicarboxylate and 60 parts by weight of ethylene glycol, and the mixture was gradually heated from a temperature of 150° C. to a temperature of 240° C., to perform an ester interchange reaction. During the reaction, when the reaction temperature reached 170° C., 0.024 part by weight of antimony trioxide was added. Further, when the reaction temperature reached 220° C., 0.042 part by weight of 3,5-dicarboxybenzenesulfonic acid tetrabutylphosphonium salt (corresponding to 2 mmol %) was added. Then, in succession, the ester interchange reaction was performed, and 0.023 part by weight of trimethylphosphoric acid was added. Subsequently, the reaction product was transferred into a polymerization reactor, and heated to a temperature of 290° C., and at a highly reduced pressure of 30 Pa, a polycondensation reaction was performed, when the stirring torque of the polymerization reactor showed a predetermined value (the particular value depends on the specification of the polymerization reactor, but the value shown by polyethylene-2,6-naphthalate with an intrinsic viscosity of 0.65 in this polymerization reactor was considered as the predetermined value). So, the reaction system was purged with nitrogen, to return to atmospheric pressure, for terminating the polycondensation reaction, and a strand was discharged into cold water and immediately cut to obtain polyethylene-2,6-naphthalate pellets X' with an intrinsic viscosity of 0.65.

Reference Example 5

A vented double-screw kneading extruder with the screws rotating in the same direction, heated to 280° C., was charged with 98 parts by weight of the pellets X' prepared in Reference Example 4 and 20 parts by weight of an aqueous slurry containing 10 wt % of crosslinked spherical polystyrene particles with an average particle size of 0.3 μm (2 parts by weight as crosslinked spherical polystyrene), and the vent hole was kept at a vacuum degree of 1 kPa or less to remove water, for obtaining PEN pellets Y' with an intrinsic viscosity of 0.65 containing 2 wt % of crosslinked spherical polystyrene particles with an average particle size of 0.3 μm.

Reference Example 6

PEN pellets Z' with an intrinsic viscosity of 0.65 containing 2 wt % of crosslinked spherical polystyrene particles with an average particle size of 0.8 μm were obtained according to the same method as described in Reference Example 5, except that crosslinked spherical polystyrene particles with an average particle size of 0.8 μm were used instead of the crosslinked spherical polystyrene particles with an average particle size of 0.3 μm.

Example 1

Two extruders M and N were used. The extruder M heated to 280° C. was charged with 98 parts by weight of the PET pellets X obtained in Reference Example 1 and 2 parts by weight of the PET pellets Y obtained in Reference Example 2 after drying them respectively at 180° C. for 3 hours under reduced pressure, and the extruder N also heated to 280° C. was charged with 89.5 parts by weight of the PET pellets X obtained in Reference Example 1, 10 parts by weight of the PET pellets Y obtained in Reference Example 2 and 0.5 part by weight of the PET pellets Z obtained in Reference Example 3 after drying them respectively at 180° C. for 3 hours under reduced pressure. They were joined in a T die, to be laminated in two layers {lamination ratio M (surface side A)/N (surface side B)=7/1}, and brought into contact with a casting drum with a surface temperature of 25° C. with electrostatic charges applied, to be cooled and solidified, for preparing a layered cast film.

The layered cast film was biaxially stretched using a simultaneous biaxial tenter with linear motor-driven clips. It was stretched simultaneously in the machine direction and in the transverse direction to 3.5 times×3.5 times at a temperature of 90° C. and at a stretching rate of 6,000%/min, and cooled to 70° C. In succession, it was re-stretched simultaneously in the machine direction and in the transverse direction to 1.4 times×1.4 times at a temperature of 165° C. Further, it was heat-treated at a temperature of 175° C. for 1 second while it was stretched to 1.05 times in the transverse direction, and subsequently given a relaxation of 2% in the transverse direction, to prepare a 5 μm thick biaxially oriented polyester film. The prepared biaxially oriented polyester film was stored at 25° C. and at 30% RH.

Then, the obtained polyester film was set on the unwinding roll portion 13 of the vacuum evaporator 11 shown in FIG. 2, and the evaporator was evacuated to a vacuum degree of $1.5 \times 10^{-3}$ Pa. Subsequently the polyester film was made to run along the cooling drum 16 of $-20°$ C. at a carrying speed of 60 m/min with a carrying tension of 100 N. At this time, 99.99 wt % of aluminum was heated and evaporated by an electron beam (output 5.1 kW), and further oxygen gas was supplied in the same direction as the metal vapor at 2.0 L/min from the oxygen supply nozzle 24 installed on a lateral side of the crucible 23 used as the vapor source, to form a thin aluminum oxide vapor deposition layer (100 nm thick) on the surface side B of the film, the film then being wound. Next, a thin aluminum oxide vapor deposition layer was formed on the surface side A of the film in the same way except that the carrying tension was 80 N. After completion of vapor deposition on both sides, the vacuum evaporator was internally returned to atmospheric pressure, and the wound film was rewound with humidification at 25° C. and 80% RH, and aged in an environment of 40° C. for 2 days, to obtain a magnetic recording medium substrate.

The obtained magnetic recording medium substrate was evaluated. As shown in Tables 1 to 3, the polyester film had aluminum oxide layers on both surfaces, and the thicknesses of the vapor deposition layers, light transmittance and surface resistivity values were kept in the ranges of this invention. Further, when it was used as a magnetic tape, it was small in the dimensional change rate and had excellent properties.

Example 2

A magnetic recording medium substrate was obtained according to the same method as described in Example 1, except that the carrying speed in the vapor deposition step was changed to 70 m/min, the introduced amount of oxygen gas was changed to 1.0 L/min, and that the electron beam output was changed to 5.3 kW. The obtained magnetic recording medium substrate had excellent properties when it was used as a magnetic tape, as shown in Tables 1 to 3.

Example 3

A magnetic recording medium substrate was obtained according to the same method as described in Example 1, except that the carrying speed in the vapor deposition step was changed to 90 m/min, the introduced amount of oxygen gas was changed to 3.2 L/min, and that the electron beam output was changed to 6.1 kW. The obtained magnetic recording medium substrate had excellent properties when it was used as a magnetic tape, as shown in Tables 1 to 3.

Example 4

A magnetic recording medium substrate was obtained according to the same method as described in Example 1, except that the carrying speed in the vapor deposition step was changed to 30 m/min, the introduced amount of oxygen gas was changed to 6.0 L/min, and that the electron beam output was changed to 3.8 kW. The obtained magnetic recording medium substrate had excellent properties when it was used as a magnetic tape, as shown in Tables 1 to 3.

Example 5

A magnetic recording medium substrate was obtained according to the same method as described in Example 1, except that the carrying speed in the vapor deposition step was changed to 120 m/min, the introduced amount of oxygen gas was changed to 2.0 L/min, and that the electron beam output was changed to 5.1 kW. The obtained magnetic recording medium substrate had excellent properties when it was used as a magnetic tape, as shown in Tables 1 to 3. Meanwhile, in this example, the carrying speed was higher than that of Example 1. Since the carrying speed was higher, the layers M were thinner, and as a result, the total light transmittance and surface resistivity values were higher.

Example 6

A magnetic recording medium substrate was obtained according to the same method as described in Example 1, except that the carrying speed in the vapor deposition step was changed to 25 m/min, the introduced amount of oxygen gas was changed to 2.0 L/min, and that the electron beam output was changed to 5.1 kW. The obtained magnetic recording medium substrate had excellent properties when it was used as a magnetic tape, as shown in Tables 1 to 3. Meanwhile, in this example, the carrying speed was lower than that of Example 1. Since the carrying speed was lower, the layers M were thicker, and as a result, the total light transmittance and surface resistivity values were lower.

Example 7

A magnetic recording medium substrate was obtained according to the same method as described in Example 1, except that two extruders were not used, that an extruder M heated to 280° C. was charged with 89.5 parts by weight of the PET pellets X obtained in Reference Example 1, 10 parts by weight of the PET pellets Y obtained in Reference Example 2, and 0.5 part by weight of the PET pellets Z obtained in Reference Example 3, after drying them respectively at 180° C. for 3 hours under reduced pressure, and that a biaxially oriented polyester film with a single layer was prepared. The obtained magnetic recording medium substrate had excellent properties when it was used as a magnetic tape, as shown in Tables 1 to 3.

Example 8

A magnetic recording medium substrate was obtained according to the same method as described in Example 1, except that the stretching ratios for biaxial stretching were 2.0 times×3.5 times in the first step, 1.2 times×1.4 times in the second step and 1.05 times in the transverse direction in the third step.

The obtained magnetic recording medium substrate had excellent properties when it was used as a magnetic tape, as shown in Tables 1 to 3.

Example 9

A vented double screw kneading extruder with the screws rotating in the same direction, heated to 290° C., was charged with 50 wt % of the PET pellets X obtained in Reference Example 1 and 50 wt % of the pellets of polyetherimide "Ultem 1010" (intrinsic viscosity 0.68) produced by GE Plastics, to prepare blend chips (I).

Two extruders M and N were used. The extruder M heated to 295° C. was charged with 88 wt % of the PET pellets X obtained in Reference Example 1, 2 wt % of the PET pellets Y obtained in Reference Example 2, and 10 wt % of the blend chips (I), after drying them respectively at 180° C. for 3 hours under reduced pressure, and the extruder N also heated to 295° C. was changed with 79.5 wt % of the PET pellets X obtained in Reference Example 1, 10 wt % of the PET pellets Y obtained in Reference Example 2, 0.5 wt % of the PET pellets Z obtained in Reference Example 3, and 10 wt % of the blend chips (I), after drying them respectively at 180° C. for 3 hours under reduced pressure. The respective mixtures were joined in a T die, to be laminated in two layers {lamination ratio M (surface side A)/N (surface side B)=5/1}, and brought into contact with a casting drum with a surface temperature of 25° C. with electrostatic charges applied, to be cooled and solidified, for obtaining a layered cast film. The cast film was biaxially stretched by a simultaneous biaxial tenter with linear motor-driven clips. It was simultaneously stretched in the machine direction and in the transverse direction to 3.5 times×3.5 times at a temperature of 95° C. and at a stretching rate of 6,000%/min, and cooled to 70° C. In succession, it was simultaneously re-stretched in the machine direction and in the transverse direction to 1.4 times×1.4 times at a temperature of 170° C. Further, it was heat-treated at a temperature of 175° C. for 1 second while it was stretched to 1.05 time in the transverse direction, and subsequently given a relaxation of 2% in the transverse direction, to produce a 5 µm thick biaxially oriented polyester film.

A magnetic recording medium substrate was obtained according to the same method as described in Example 1, except as described above. The obtained magnetic recording medium substrate had excellent properties when it was used as a magnetic tape, as shown in Table 1 to 3.

Example 10

Two extruders M and N were used. The extruder M heated to 280° C. was charged with 98 parts by weight of the PEN pellets X' obtained in Reference Example 4, and 2 parts by weight of the PEN pellets Y' obtained in Reference Example 5, after drying them respectively at 180° C. for 3 hours under reduced pressure, and the extruder N also heated to 28° C. was charged with 89.5 parts by weight of the PEN pellets X' obtained in Reference Example 4, 10 parts by weight of the PEN pellets Y' obtained in Reference Example 5, and 0.5 parts by weight of the PEN pellets Z' obtained in Reference Example 6, after drying them respectively at 180° C. for 3 hours under reduced pressure. The mixtures were joined in a T die, to be laminated in two layers {lamination ratio M (surface side A)/N (surface side B)=7/1}, and brought into contact with a casting drum with a surface temperature of 25° C. with electrostatic charges applied, to be cooled and solidified, for preparing a layered cast film.

Further, the obtained cast film was biaxially stretched by a simultaneous biaxial tenter with linear motor-driven clips. It was stretched simultaneously in the machine direction and in the transverse direction to 4.0 times×4.0 times at a temperature of 135° C. and at a stretching rate of 6,000%/min, and cooled to 70° C. In succession, it was re-stretched simultaneously in the machine direction and in the transverse direction to 1.2 times×1.2 times at a temperature of 180° C. Further, it was heat-treated at a temperature of 195° C. for 1 second while it was stretched to 1.05 times in the transverse direction, and subsequently given a relaxation of 2% in the transverse direction, to prepare a 5 µm thick biaxially oriented polyester film.

A magnetic recording medium substrate was obtained according to the same method as described in Example 1, except as described above. The obtained magnetic recording medium substrate had excellent properties when it was used as a magnetic tape, as shown in Tables 1 to 3.

Example 11

A magnetic recording medium substrate was obtained according to the same method as described in Example 1, except that the polyester film was made to have a thickness of 6.1 µm by controlling the extrusion conditions. The obtained magnetic recording medium substrate had excellent properties when it was used as a magnetic tape, as shown in Tables 1 to 3.

Example 12

A magnetic recording medium substrate was obtained according to the same method as described in Example 1, except that the polyester film was made to have a thickness of 4.0 µm by controlling the extrusion conditions. The obtained magnetic recording medium substrate had excellent properties when it was used as a magnetic tape, as shown in Tables 1 to 3.

Example 13

A magnetic recording medium substrate was obtained according to the same method as described in Example 1, except that the stretching ratios for biaxial stretching were changed to 3.5 times×3.5 times in the first step, 1.2 times×1.6 times in the second step and 1.05 times in the transverse direction in the third step. The obtained magnetic recording medium substrate had excellent properties when it was used as a magnetic tape, as shown in Tables 1 to 3.

Example 14

A magnetic recording medium substrate was obtained according to the same method as described in Example 9, except that the stretching ratios for biaxial stretching were changed to 3.5 times×3.5 times in the first step, 1.2 times×1.6 times in the second step and 1.05 times in the transverse direction in the third step. The obtained magnetic recording medium substrate had excellent properties when it was used as a magnetic tape, as shown in Tables 1 to 3.

Example 15

When a cast film was biaxially stretched, it was stretched simultaneously in the machine direction and in the transverse direction to 3.5 times×4.2 times at a temperature of 125° C. and at a stretching rate of 6,000%/min, and cooled to 70° C. In succession, it was re-stretched simultaneously in the machine direction and in the transverse direction to 1.1 times×1.4 times at a temperature of 180° C. Further, it was heat-treated at 195° C. for 1 second while it was stretched to 1.05 times in the transverse direction, and subsequently given a relaxation of 2% in the transverse direction, to prepare a 5 μm thick biaxially oriented polyester film.

A magnetic recording medium substrate was obtained according to the same method as described in Example 10, except as described above. The obtained magnetic recording medium substrate had excellent properties when it was used as a magnetic tape, as shown in Tables 1 to 3.

Example 16

A magnetic recording medium substrate was obtained according to the same method as described in Example 1, except that the stretching ratios for biaxial stretching were changed to 3.5 times×3.5 times in the first step, 1.6 times×1.2 times in the second step and 1.05 times in the transverse direction in the third step. The obtained magnetic recording medium substrate had excellent properties when it was used as a magnetic tape, as shown in Tables 1 to 3.

Example 17

A magnetic recording medium substrate was obtained according to the same method as described in Example 9, except that the stretching ratios for biaxial stretching were changed to 3.5 times×3.5 times in the first step, 1.6 times×1.2 times in the second step and 1.05 times in the transverse direction in the third step. The obtained magnetic recording medium substrate had excellent properties when it was used as a magnetic tape, as shown in Tables 1 to 3.

Example 18

When a cast film was biaxially stretched, it was stretched simultaneously in the machine direction and in the transverse direction to 4.2 times×3.5 times at a temperature of 125° C. and at a stretching rate of 6,000%/min, and cooled to 70° C. In succession, it was re-stretched simultaneously in the machine direction and in the transverse direction to 1.4 times×1.1 times at a temperature of 180° C. Further it was heat-treated at 195° C. for 1 second while it was stretched to 1.05 times in the transverse direction, and subsequently given a relaxation of 2% in the transverse direction, to prepare a 5 μm thick biaxially oriented polyester film.

A magnetic recording medium substrate was obtained according to the same method as described in Example 1, except as described above. The obtained magnetic recording medium substrate had excellent properties when it was used as a magnetic tape, as shown in Tables 1 to 3.

Example 19

When a cast film was biaxially stretched, it was stretched in the machine direction in two steps to 3.0 times at a rate of 20,000%/min and at a temperature of 90° C. by a roll stretcher and stretched in the transverse direction to 3.0 times at a rate of 2,000%/min and at a temperature of 100° C. by a tenter. In succession, it was re-stretched in the longitudinal direction in one step to 1.7 times at a temperature of 140° C. by a roll stretcher. Then, it was re-stretched in the transverse direction to 1.5 times at a temperature of 170° C. by a tenter. Subsequently with the length kept constant, it was heat-treated at a temperature of 190° C. for 1 second and subsequently given a relaxation of 2% in the transverse direction, to prepare a 5 μm thick biaxially oriented polyester film.

A magnetic recording medium substrate was obtained according to the same method as described in Example 1, except as described above. The obtained magnetic recording medium substrate had excellent properties when it was used as a magnetic tape, as shown in Tables 1 to 3.

Example 20

A magnetic recording medium substrate was obtained according to the same method as described in Example 1, except that the metallic material in the vapor deposition step was changed to a mixture consisting of 50 wt % of aluminum and 50 wt % of copper, that the carrying speed was changed to 60 m/min, that the introduced amount of oxygen gas was changed to 2.0 L/min, and that the electron beam output was changed to 5.5 kW. The obtained magnetic recording medium substrate had excellent properties when it was used as a magnetic tape, as shown in Tables 1 to 3.

Example 21

On each of both the surfaces of a polyester film, two thin vapor deposition layers were formed. At first, a 180 nm thick silica layer was formed according to the same method as described in Example 1, except that the metallic material in the vapor deposition step was changed to 99.99 wt % silica, that the carrying speed was changed to 50 m/min, that the introduced amount of oxygen gas was changed to 1.0 L/min, and that the electron beam output was changed to 5.0 kW. Then, on the silica layer, a 20 nm thick aluminum oxide layer was formed according to the same method as described in Example 1, except that the metallic material was changed to 99.99 wt % aluminum, that the carrying speed was changed to 60 m/min, that the introduced amount of oxygen gas was changed to 2.0 L/min, and that the electron beam output was changed to 4.0 kW.

A magnetic recording medium substrate was obtained according to the same method as described in Example 1, except as described above. The obtained magnetic recording medium substrate had excellent properties when it was used as a magnetic tape, as shown in Tables 1 to 3.

Example 22

A magnetic recording medium substrate was obtained according to the same method as described in Example 1, except that the metallic material in the vapor deposition step was changed to 99.99 wt % copper, that the carrying speed was changed to 60 m/min, that the introduced amount of oxygen gas was changed to 3.0 L/min, and that the electron beam output was changed to 6.5 kW. The obtained magnetic recording medium substrate had excellent properties when it was used as a magnetic tape, as shown in Tables 1 to 3.

Example 23

A magnetic recording medium substrate was obtained according to the same method as described in Example 1, except that the metallic material in the vapor deposition step was changed to 99.9999 wt % zinc, that the carrying speed was changed to 60 m/min, that the introduced amount of oxygen gas was changed to 2.5 L/min, and that the electron beam output was changed to 5.8 kW. The obtained magnetic recording medium substrate had excellent properties when it was used as a magnetic tape, as shown in Tables 1 to 3.

Example 24

A magnetic recording medium substrate was obtained according to the same method as described in Example 4, except that the rewinding with humidification was not performed after vapor deposition of the layers M. The obtained magnetic recording medium substrate was larger in the abundance ratio of the aluminum atoms bound to hydroxyl groups compared with Example 4 and was somewhat large in the humidity expansion coefficient, as shown in Tables 1 to 3.

Example 25

A magnetic recording medium substrate was obtained according to the same method as described in Example 1, except that the prepared biaxially oriented polyester film was stored at 25° C. and 65% RH. The water absorbed in the polyester film was discharged when the layers M were formed, and as shown in Tables 1 to 3, the abundance ratio of the aluminum atoms bound to hydroxyl groups was larger compared with Example 1, to somewhat increase the humidity expansion coefficient and to lower the dimensional stability.

Example 26

A magnetic recording medium substrate was obtained according to the same method as described in Example 1, except that the layers M were formed by a method of winding an induction heating coil around the crucible 23 for direct heating without using the electron beam 21 emitted from the electron gun 20. The obtained magnetic recording medium substrate was larger in the abundance ratio of the aluminum atoms held together by metallic bonding compared with Example 1 and became somewhat higher in the error rate as shown in Tables 1 to 3.

Example 27

A magnetic recording medium substrate was obtained according to the same method as described in Example 3, except that the layers M were formed by a method of winding an induction heating coil around the crucible 23 for direct heating without using the electron beam emitted from the electron gun 20. The obtained magnetic recording medium substrate was smaller in the abundance ratio of the aluminum atoms held together by metallic bonding compared with Example 3 and became somewhat lower in the crack resistance as shown in Tables 1 to 3.

TABLE 1

| | Vapor deposition | Metallic material | Oxygen concentration of surface A [at. %] | Oxygen concentration of surface B [at. %] | Vapor deposition thickness of surface A [nm] | Vapor deposition thickness of surface B [nm] | Base film (thickness in μm) | Ra of surface A [nm] | Ra of surface B [nm] |
|---|---|---|---|---|---|---|---|---|---|
| Example 1 | Both surfaces | Al | 58 | 58 | 100 | 100 | PET (5.0) | 5 | 10 |
| Example 2 | Both surfaces | Al | 50 | 50 | 100 | 100 | PET (5.0) | 5 | 10 |
| Example 3 | Both surfaces | Al | 60 | 60 | 100 | 100 | PET (5.0) | 5 | 10 |
| Example 4 | Both surfaces | Al | 62 | 62 | 100 | 100 | PET (5.0) | 5 | 10 |
| Example 5 | Both surfaces | Al | 58 | 58 | 50 | 50 | PET (5.0) | 5 | 10 |
| Example 6 | Both surfaces | Al | 61 | 61 | 200 | 200 | PET (5.0) | 5 | 10 |
| Example 7 | Both surfaces | Al | 58 | 58 | 100 | 100 | PET (5.0) | 15 | 15 |
| Example 8 | Both surfaces | Al | 58 | 58 | 100 | 100 | PET (5.0) | 5 | 10 |
| Example 9 | Both surfaces | Al | 58 | 58 | 100 | 100 | PET/PEI (5.0) | 5 | 10 |
| Example 10 | Both surfaces | Al | 58 | 58 | 100 | 100 | PEN (5.0) | 5 | 10 |
| Example 11 | Both surfaces | Al | 58 | 58 | 100 | 100 | PET(6.0) | 5 | 10 |
| Example 12 | Both surfaces | Al | 58 | 58 | 100 | 100 | PET(4.0) | 5 | 10 |
| Example 13 | Both surfaces | Al | 58 | 58 | 100 | 100 | PET (5.0) | 5 | 10 |
| Example 14 | Both surfaces | Al | 58 | 58 | 100 | 100 | PET/PEI (5.0) | 5 | 10 |
| Example 15 | Both surfaces | Al | 58 | 58 | 100 | 100 | PEN (5.0) | 5 | 10 |

TABLE 1-continued

| | Vapor deposition | Metallic material | Oxygen concentration of surface A [at. %] | Oxygen concentration of surface B [at. %] | Vapor deposition thickness of surface A [nm] | Vapor deposition thickness of surface B [nm] | Base film (thickness in μm) | Ra of surface A [nm] | Ra of surface B [nm] |
|---|---|---|---|---|---|---|---|---|---|
| Example 16 | Both surfaces | Al | 58 | 58 | 100 | 100 | PET (5.0) | 5 | 10 |
| Example 17 | Both surfaces | Al | 58 | 58 | 100 | 100 | PET/PEI (5.0) | 5 | 10 |
| Example 18 | Both surfaces | Al | 58 | 58 | 100 | 100 | PEN (5.0) | 5 | 10 |
| Example 19 | Both surfaces | Al | 58 | 58 | 100 | 100 | PET (5.0) | 5 | 10 |
| Example 20 | Both surfaces | Al + Cu | 40 | 40 | 100 | 100 | PET (5.0) | 5 | 10 |
| Example 21 | Both surfaces | Si/Al | 60 | 60 | 200 | 200 | PET (5.0) | 5 | 10 |
| Example 22 | Both surfaces | Cu | 40 | 40 | 100 | 100 | PET (5.0) | 5 | 10 |
| Example 23 | Both surfaces | Zn | 40 | 40 | 100 | 100 | PET (5.0) | 5 | 10 |
| Example 24 | Both surfaces | Al | 62 | 62 | 100 | 100 | PET (5.0) | 5 | 10 |
| Example 25 | Both surfaces | Al | 58 | 58 | 100 | 100 | PET (5.0) | 5 | 10 |
| Example 26 | Both surfaces | Al | 58 | 58 | 100 | 100 | PET (5.0) | 5 | 10 |
| Example 27 | Both surfaces | Al | 60 | 60 | 100 | 100 | PET (5.0) | 5 | 10 |

TABLE 2

| | Total light transmittance [%] | Surface resistivity of surface A [Ω] | Surface resistivity of surface B [Ω] | Humidity expansion coefficient in transverse direction [ppm/% RH] | Young's modulus in machine direction [GPa] | Young's modulus in transverse direction [GPa] | Dimensional stability | Crack resistance | Error rate |
|---|---|---|---|---|---|---|---|---|---|
| Example 1 | 30 | $1 \times 10^5$ | $2 \times 10^5$ | 4 | 8 | 8 | ◎ | ◎ | ◎ |
| Example 2 | 0 | $1 \times 10^2$ | $3 \times 10^2$ | 5 | 7 | 7 | ○ | ◎ | ○ |
| Example 3 | 70 | $2 \times 10^9$ | $3 \times 10^9$ | 6 | 8.5 | 8.5 | ○ | ○ | ◎ |
| Example 4 | 60 | $2 \times 10^{11}$ | $2 \times 10^{11}$ | 7 | 9 | 9 | ○ | ○ | ○ |
| Example 5 | 50 | $6 \times 10^7$ | $7 \times 10^7$ | 7 | 6.5 | 6.5 | ○ | ◎ | ◎ |
| Example 6 | 10 | $2 \times 10^4$ | $4 \times 10^4$ | 5 | 9 | 9 | ◎ | ○ | ○ |
| Example 7 | 30 | $1 \times 10^5$ | $3 \times 10^5$ | 4 | 8 | 8 | ◎ | ◎ | ○ |
| Example 8 | 30 | $3 \times 10^5$ | $3 \times 10^5$ | 4 | 4 | 7 | ○ | ◎ | ○ |
| Example 9 | 35 | $2 \times 10^5$ | $5 \times 10^5$ | 4 | 7.7 | 7.7 | ◎ | ◎ | ◎ |
| Example 10 | 30 | $4 \times 10^5$ | $5 \times 10^5$ | 7 | 10 | 10 | ○ | ◎ | ◎ |
| Example 11 | 30 | $1 \times 10^5$ | $1 \times 10^5$ | 4.5 | 7.8 | 7.8 | ○ | ◎ | ○ |
| Example 12 | 30 | $8 \times 10^5$ | $9 \times 10^5$ | 2.5 | 8.1 | 8.1 | ◎ | ◎ | ◎ |
| Example 13 | 30 | $3 \times 10^5$ | $4 \times 10^5$ | 2 | 6 | 9 | ◎ | ◎ | ◎ |
| Example 14 | 35 | $7 \times 10^5$ | $9 \times 10^5$ | 2 | 5.7 | 8.7 | ◎ | ◎ | ◎ |
| Example 15 | 30 | $3 \times 10^5$ | $4 \times 10^5$ | 5 | 8 | 12 | ◎ | ◎ | ◎ |
| Example 16 | 30 | $1 \times 10^5$ | $2 \times 10^5$ | 8 | 9 | 6 | ○ | ◎ | ◎ |
| Example 17 | 35 | $1 \times 10^5$ | $2 \times 10^5$ | 8 | 8.7 | 5.7 | ○ | ◎ | ◎ |
| Example 18 | 30 | $6 \times 10^5$ | $6 \times 10^5$ | 10 | 12 | 8 | ○ | ◎ | ◎ |
| Example 19 | 30 | $3 \times 10^5$ | $5 \times 10^5$ | 4 | 7.5 | 7.5 | ○ | ○ | ○ |
| Example 20 | 10 | $4 \times 10^2$ | $3 \times 10^2$ | 5 | 7.5 | 7.5 | ○ | ○ | ○ |
| Example 21 | 75 | $3 \times 10^5$ | $3 \times 10^5$ | 4 | 8.2 | 8.2 | ○ | ○ | ○ |
| Example 22 | 5 | $9 \times 10^{10}$ | $6 \times 10^{10}$ | 5 | 8.7 | 8.7 | ○ | ○ | ○ |
| Example 23 | 50 | $3 \times 10^3$ | $8 \times 10^3$ | 5 | 6.9 | 6.9 | ○ | ○ | ○ |
| Example 24 | 60 | $2 \times 10^{11}$ | $2 \times 10^{11}$ | 7.5 | 9 | 9 | ○ | ○ | ◎ |
| Example 25 | 30 | $1 \times 10^5$ | $2 \times 10^5$ | 6 | 8 | 8 | ○ | ◎ | ◎ |
| Example 26 | 5 | $7 \times 10^2$ | $8 \times 10^2$ | 5 | 7 | 7 | ○ | ◎ | ○ |
| Example 27 | 65 | $8 \times 10^{11}$ | $6 \times 10^{11}$ | 7.5 | 8.5 | 8.5 | ○ | Δ | ◎ |

In the values of surface resistivity shown in the table, "$10^n$" means "n-th power of 10."

TABLE 3

| | Vapor deposition | Metallic material | Metal concentration of surface A [at. %] | Metal concentration of surface B [at. %] | Abundance ratio of the metal atoms held together by metallic bonding of surface A [at. %] | Abundance ratio of the metal atoms held together by metallic bonding of surface B [at. %] | Abundance ratio of the aluminum atoms bound to hydroxyl groups of surface A [at. %] | Abundance ratio of the aluminum atoms bound to hydroxyl groups of surface B [at. %] |
|---|---|---|---|---|---|---|---|---|
| Example 1 | Both surfaces | Al | 42 | 42 | 4.3 | 4.2 | 30 | 30 |
| Example 2 | Both surfaces | Al | 50 | 50 | 13 | 12 | 35 | 35 |
| Example 3 | Both surfaces | Al | 40 | 40 | 2.1 | 2.1 | 45 | 45 |
| Example 4 | Both surfaces | Al | 38 | 38 | 1.7 | 1.7 | 55 | 55 |
| Example 5 | Both surfaces | Al | 42 | 42 | 2.9 | 2.8 | 33 | 33 |
| Example 6 | Both surfaces | Al | 39 | 39 | 5.5 | 5.4 | 35 | 35 |
| Example 7 | Both surfaces | Al | 42 | 42 | 4.3 | 4.2 | 30 | 30 |
| Example 8 | Both surfaces | Al | 42 | 42 | 4.2 | 4.2 | 30 | 30 |
| Example 9 | Both surfaces | Al | 42 | 42 | 4.2 | 4 | 30 | 30 |
| Example 10 | Both surfaces | Al | 42 | 42 | 4.1 | 4 | 30 | 30 |
| Example 11 | Both surfaces | Al | 42 | 42 | 4.3 | 4.3 | 30 | 30 |
| Example 12 | Both surfaces | Al | 42 | 42 | 3.6 | 3.6 | 30 | 30 |
| Example 13 | Both surfaces | Al | 42 | 42 | 4.1 | 4.1 | 30 | 30 |
| Example 14 | Both surfaces | Al | 42 | 42 | 3.7 | 3.6 | 30 | 30 |
| Example 15 | Both surfaces | Al | 42 | 42 | 4.2 | 4.1 | 30 | 30 |
| Example 16 | Both surfaces | Al | 42 | 42 | 4.3 | 4.2 | 30 | 30 |
| Example 17 | Both surfaces | Al | 42 | 42 | 4.3 | 4.2 | 30 | 30 |
| Example 18 | Both surfaces | Al | 42 | 42 | 3.9 | 3.9 | 30 | 30 |
| Example 19 | Both surfaces | Al | 42 | 42 | 4.1 | 4 | 30 | 30 |
| Example 20 | Both surfaces | Al + Cu | 60 | 60 | 16 | 16 | — | — |
| Example 21 | Both surfaces | Si/Al | 40 | 40 | 6 | 6 | — | — |
| Example 22 | Both surfaces | Cu | 60 | 60 | 1.1 | 1.2 | — | — |
| Example 23 | Both surfaces | Zn | 60 | 60 | 5.9 | 5.7 | — | — |
| Example 24 | Both surfaces | Al | 38 | 38 | 1.7 | 1.7 | 61 | 61 |
| Example 25 | Both surfaces | Al | 42 | 42 | 3.5 | 3.5 | 44 | 44 |
| Example 26 | Both surfaces | Al | 42 | 42 | 21 | 21 | 32 | 32 |
| Example 27 | Both surfaces | Al | 40 | 40 | 0.9 | 0.9 | 57 | 57 |

Comparative Example 1

A magnetic recording medium substrate was obtained according to the same method as described in Example 1, except that no oxygen gas was supplied in the vapor deposition step. The obtained magnetic recording medium substrate did not have the aluminum oxide layer and had poor properties when it was used as a magnetic tape, as shown in Tables 4 to 6.

Comparative Example 2

A magnetic recording medium substrate was obtained according to the same method as described in Example 1, except that the carrying speed in the vapor deposition step was changed to 10 m/min, that the introduced amount of oxygen gas was changed to 12.0 L/min, and that the electron beam output was changed to 3.2 kW. The obtained magnetic recording medium substrate had a light transmittance of 90% and a surface resistivity of $10^{13}\Omega$ and had poor properties when it was used as a magnetic tape, as shown in Tables 4 to 6.

Comparative Example 3

A magnetic recording medium substrate was obtained according to the same method as described in Example 1, except that the carrying speed in the vapor deposition step was changed to 220 m/min, that the introduced amount of oxygen gas was changed to 1.0 L/min, and that the electron beam output was changed to 5.3 kW. The obtained magnetic recording medium substrate had a surface resistivity of $10^1 \Omega$ and had poor properties when it was used as a magnetic tape, as shown in Tables 4 to 6.

Comparative Example 4

A magnetic recording medium substrate was obtained according to the same method as described in Example 1, except that the carrying speed in the vapor deposition step was changed to 40 m/min, that the introduced amount of oxygen gas was changed to 10.0 L/min, and that the electron beam output was changed to 8.9 kW. The obtained magnetic recording medium substrate had a surface resistivity of $10^{13} \Omega$ and had poor properties when it was used as a magnetic tape, as shown in Tables 4 to 6.

Comparative Example 5

A magnetic recording medium substrate was obtained according to the same method as described in Example 1, except that the carrying speed in the vapor deposition step was changed to 30 m/min, that the introduced amount of oxygen gas was changed to 15.0 L/min, and that the electron beam output was changed to 4.3 kW. The obtained magnetic recording medium substrate had a light transmittance of 80% and had poor properties when it was used as a magnetic tape, as shown in Tables 4 to 6.

Comparative Example 6

A magnetic recording medium substrate was obtained according to the same method as described in Example 1, except that the carrying speed in the vapor deposition step was changed to 180 m/min, that the introduced amount of oxygen gas was changed to 5.0 L/min, and that the electron beam output was changed to 1.3 kW. The obtained magnetic recording medium substrate had a vapor deposition thickness of 40 nm and had poor properties when it was used as a magnetic tape, as shown in Tables 4 to 6.

Comparative Example 7

A magnetic recording medium substrate was obtained according to the same method as described in Example 1, except that the carrying speed in the vapor deposition step was changed to 10 m/min, that the introduced amount of oxygen was changed to 4.0 L/min, and that the electron beam output was changed to 3.3 kW. The obtained magnetic recording medium substrate had a vapor deposition thickness of 250 nm and had poor properties when it was used as a magnetic tape, as shown in Tables 4 to 6.

Comparative Example 8

A magnetic recording medium substrate was obtained according to the same method as described in Example 1, except that vapor deposition was performed on one surface only, instead of both the surfaces. The obtained magnetic recording medium substrate had a vapor deposition layer on one surface only and had poor properties when it was used as a magnetic tape, as shown in Tables 4 to 6.

Comparative Example 9

A magnetic recording medium substrate was obtained according to the same method as described in Example 1, except that the vacuum evaporator shown in FIG. 3 was used. The obtained magnetic recording medium substrate did not allow the vapor deposition thickness, light transmittance and surface resistivity to be controlled in the ranges of this invention, since the positions of the oxygen supply nozzles were improper. The magnetic recording medium substrate had poor properties when it was used as a magnetic tape, as shown in Tables 4 to 6.

Comparative Example 10

Two extruders M and N were used. The extruder M heated to 280° C. was charged with 90 parts by weight of the PET pellets X obtained in Reference Example 1 and 10 parts by weight of the PET pellets Y obtained in Reference Example 2, after drying them respectively at 180° C. for 3 hours under reduced pressure, and the extruder N also heated to 280° C. was charged with 85 parts by weight of the PET pellets obtained in Reference Example 1, 12 parts by weight of the PET pellets Y obtained in Reference Example 2 and 3 parts by weight of the PET pellets Z obtained in Reference Example 3, after drying them respectively at 180° C. for 3 hours under reduced pressure, to prepare a 5 μm thick biaxially oriented polyester film. The carrying speed during vapor deposition was 15 m/min, and the introduced amount of oxygen gas was 2.8 L/min. The electron beam output was 5.7 kW.

A magnetic recording medium substrate was obtained according to the same method as described in Example 1, except as described above. The obtained magnetic recording medium substrate had a vapor deposition thickness of 230 nm and had poor properties when it was used as a magnetic tape, as shown in Tables 4 to 6.

TABLE 4

| | Vapor deposition | Metallic material | Oxygen concentration of surface A [at. %] | Oxygen concentration of surface B [at. %] | Vapor deposition thickness of surface A [nm] | Vapor deposition thickness of surface B [nm] | Base film (thickness in μm) | Ra of surface A [nm] | Ra of surface B [nm] |
|---|---|---|---|---|---|---|---|---|---|
| Comparative Example 1 | Both surfaces | Al | 0 | 0 | 100 | 100 | PET (5.0) | 5 | 10 |
| Comparative Example 2 | Both surfaces | Al | 65 | 65 | 100 | 100 | PET (5.0) | 5 | 10 |
| Comparative Example 3 | Both surfaces | Al | 20 | 20 | 60 | 60 | PET (5.0) | 5 | 10 |
| Comparative Example 4 | Both surfaces | Al | 64 | 64 | 180 | 180 | PET (5.0) | 5 | 10 |
| Comparative Example 5 | Both surfaces | Al | 61 | 61 | 100 | 100 | PET (5.0) | 5 | 10 |

TABLE 4-continued

| | Vapor deposition | Metallic material | Oxygen concentration of surface A [at. %] | Oxygen concentration of surface B [at. %] | Vapor deposition thickness of surface A [nm] | Vapor deposition thickness of surface B [nm] | Base film (thickness in μm) | Ra of surface A [nm] | Ra of surface B [nm] |
|---|---|---|---|---|---|---|---|---|---|
| Comparative Example 6 | Both surfaces | Al | 56 | 56 | 40 | 40 | PET (5.0) | 5 | 10 |
| Comparative Example 7 | Both surfaces | Al | 60 | 60 | 250 | 250 | PET (5.0) | 5 | 10 |
| Comparative Example 8 | One surface | Al | — | 61 | — | 100 | PET (5.0) | 5 | 10 |
| Comparative Example 9 | Both surfaces | Al | 60 | 60 | 40 | 40 | PET (5.0) | 5 | 10 |
| Comparative Example 10 | Both surfaces | Al | 61 | 61 | 230 | 230 | PET (5.0) | 12 | 35 |

TABLE 5

| | Total light transmittance [%] | Surface resistivity of surface A [Ω] | Surface resistivity of surface B [Ω] | Humidity expansion coefficient in transverse direction [ppm/% RH] | Young's modulus in machine direction [GPa] | Young's modulus in transverse direction [GPa] | Dimensional stability | Crack resistance | Error rate |
|---|---|---|---|---|---|---|---|---|---|
| Comparative Example 1 | 0 | $2 \times 10^{0}$ | $1 \times 10^{0}$ | 12 | 6.5 | 6.5 | X | ◎ | X |
| Comparative Example 2 | 90 | $7 \times 10^{13}$ | $6 \times 10^{13}$ | 13 | 8 | 8 | X | X | Δ |
| Comparative Example 3 | 10 | $3 \times 10^{1}$ | $5 \times 10^{1}$ | 11 | 6.8 | 6.8 | X | ○ | X |
| Comparative Example 4 | 70 | $2 \times 10^{13}$ | $3 \times 10^{13}$ | 12 | 9 | 9 | X | X | Δ |
| Comparative Example 5 | 80 | $1 \times 10^{10}$ | $2 \times 10^{10}$ | 11 | 7.8 | 7.8 | X | X | Δ |
| Comparative Example 6 | 30 | $7 \times 10^{5}$ | $7 \times 10^{5}$ | 10 | 6.5 | 6.5 | X | Δ | Δ |
| Comparative Example 7 | 30 | $8 \times 10^{5}$ | $9 \times 10^{5}$ | 11 | 9.5 | 9.5 | X | X | Δ |
| Comparative Example 8 | 70 | $1 \times 10^{16}$ | $5 \times 10^{10}$ | 12 | 7 | 7 | X | ○ | X |
| Comparative Example 9 | 70 | $3 \times 10^{11}$ | $4 \times 10^{11}$ | 12 | 7 | 7 | X | X | Δ |
| Comparative Example 10 | 75 | $4 \times 10^{12}$ | $7 \times 10^{12}$ | 11 | 10.5 | 10.5 | X | X | X |

In the values of surface resistivity shown in the table, "10^n" means "n-th power of 10."

TABLE 6

| | Vapor deposition | Metallic material | Metal concentration of surface A [at. %] | Metal concentration of surface B [at. %] | Abundance ratio of the metal atoms held together by metallic bonding of surface A [at. %] | Abundance ratio of the metal atoms held together by metallic bonding of surface B [at. %] | Abundance ratio of the aluminum atoms bound to hydroxyl groups of surface A [at. %] | Abundance ratio of the aluminum atoms bound to hydroxyl groups of surface B [at. %] |
|---|---|---|---|---|---|---|---|---|
| Comparative Example 1 | Both surfaces | Al | 100 | 100 | 100 | 100 | 0 | 0 |
| Comparative Example 2 | Both surfaces | Al | 35 | 35 | 0.8 | 0.9 | 63 | 63 |
| Comparative Example 3 | Both surfaces | Al | 80 | 80 | 29 | 27 | 42 | 42 |
| Comparative Example 4 | Both surfaces | Al | 36 | 36 | 0.8 | 0.8 | 65 | 65 |
| Comparative Example 5 | Both surfaces | Al | 39 | 39 | 1.8 | 1.9 | 67 | 67 |
| Comparative Example 6 | Both surfaces | Al | 44 | 44 | 3.6 | 3.6 | 40 | 40 |
| Comparative Example 7 | Both surfaces | Al | 40 | 40 | 2 | 2 | 61 | 61 |
| Comparative Example 8 | One surface | Al | — | 39 | — | 1.8 | — | 38 |

TABLE 6-continued

| | Vapor deposition | Metallic material | Metal concentration of surface A [at. %] | Metal concentration of surface B [at. %] | Abundance ratio of the metal atoms held together by metallic bonding of surface A [at. %] | Abundance ratio of the metal atoms held together by metallic bonding of surface B [at. %] | Abundance ratio of the aluminum atoms bound to hydroxyl groups of surface A [at. %] | Abundance ratio of the aluminum atoms bound to hydroxyl groups of surface B [at. %] |
|---|---|---|---|---|---|---|---|---|
| Comparative Example 9 | Both surfaces | Al | 40 | 40 | 1.7 | 1.7 | 70 | 70 |
| Comparative Example 10 | Both surfaces | Al | 39 | 39 | 1.5 | 1.5 | 68 | 68 |

The invention claimed is:

1. A magnetic recording medium substrate comprising a polyester film having metallic oxide-containing layers M formed on surfaces thereof, one layer on each surface, the layers M having a thickness of 50 to 200 nm each, characterized in that the magnetic recording medium substrate has a total light transmittance of 0 to 75%, a Young's modulus in a machine direction of 5 to 13 GPa, and a surface resistivity of $1 \times 10^2$ to $1 \times 10^{13}$ Ω on each surface, and an abundance ratio of metal atoms held together by metallic bonding in the layers M is 1 to 20 at %.

2. A magnetic recording medium substrate, according to claim 1, wherein a center-line mean roughness Ra of at least one surface is 0.5 to 10 nm.

3. A magnetic recording medium substrate, according to claim 1, wherein a thickness of said polyester film is 2 to 6 μm.

4. A magnetic recording medium substrate, according to claim 1, wherein a metal element concentration of the layers M is 10 to 70 at %.

5. A magnetic recording medium substrate, according to claim 1, wherein the metallic oxide of the layers M is aluminum oxide, and an abundance ratio of aluminum atoms bound to hydroxyl groups is 0 to 60 at %.

6. A magnetic recording medium comprising the magnetic recording medium substrate as set forth in claim 1 and a magnetic layer formed on at least on one of the surfaces of said magnetic recording medium substrate.

* * * * *